(12) United States Patent
Southall et al.

(10) Patent No.: US 8,108,119 B2
(45) Date of Patent: Jan. 31, 2012

(54) APPARATUS AND METHOD FOR OBJECT DETECTION AND TRACKING AND ROADWAY AWARENESS USING STEREO CAMERAS

(75) Inventors: John Benjamin Southall, Philadelphia, PA (US); Mayank Bansal, Plainsboro, NJ (US); Aastha Jain, Chandigarh (IN); Manish Kumar, Patna Bihar (IN); Theodore Armand Camus, Marlton, NJ (US); Aveek Kumar Das, Lawrenceville, NJ (US); John Richard Fields, Princeton Junction, NJ (US); Gary Alan Greene, West Windsor, NJ (US); Jayakrishnan Eledath, Robbinsville, NJ (US)

(73) Assignee: SRI International, Menlo Park, CA (US)

( * ) Notice: Subject to any disclaimer, the term of this patent is extended or adjusted under 35 U.S.C. 154(b) by 721 days.

(21) Appl. No.: 11/739,068

(22) Filed: Apr. 23, 2007

(65) Prior Publication Data
US 2007/0255480 A1 Nov. 1, 2007

Related U.S. Application Data

(60) Provisional application No. 60/794,064, filed on Apr. 21, 2006.

(51) Int. Cl.
*B60T 7/12* (2006.01)
(52) U.S. Cl. ............ 701/96; 701/93; 701/300; 701/301; 382/103; 382/104; 382/106; 382/107; 382/168; 382/170; 382/171; 382/172
(58) Field of Classification Search ............... 701/93, 701/96, 300, 301; 382/102, 104, 106, 107, 382/168, 170, 171, 172
See application file for complete search history.

(56) References Cited

U.S. PATENT DOCUMENTS

| 5,369,590 | A | * | 11/1994 | Karasudani | 701/300 |
|---|---|---|---|---|---|
| 5,535,144 | A | * | 7/1996 | Kise | 702/158 |
| 5,761,326 | A | * | 6/1998 | Brady et al. | 382/103 |
| 6,477,260 | B1 | | 11/2002 | Shimomura | |
| 6,744,380 | B2 | | 6/2004 | Imanishi et al. | |
| 6,853,738 | B1 | * | 2/2005 | Nishigaki et al. | 382/106 |
| 6,888,953 | B2 | * | 5/2005 | Hanawa | 382/104 |

(Continued)

OTHER PUBLICATIONS

Graefe V, Efenberger W (1996) A novel approach for the detection of vehicles on freeways by real-time vision. In: Proceedings of the Intelligent Vehicles Symposium, Tokyo, Japan, 1996. IEEE Industrial Electronics Society, Piscataway, N.J., pp. 363-368.*

(Continued)

*Primary Examiner* — Thomas Black
*Assistant Examiner* — Peter D Nolan
(74) *Attorney, Agent, or Firm* — Lowenstein Sandler PC

(57) ABSTRACT

The present invention provides a collision avoidance apparatus and method employing stereo vision applications for adaptive vehicular control. The stereo vision applications are comprised of a road detection function and a vehicle detection and tracking function. The road detection function makes use of three-dimensional point data, computed from stereo image data, to locate the road surface ahead of a host vehicle. Information gathered by the road detection function is used to guide the vehicle detection and tracking function, which provides lead motion data to a vehicular control system of the collision avoidance apparatus. Similar to the road detection function, stereo image data is used by the vehicle detection and tracking function to determine the depth of image scene features, thereby providing a robust means for identifying potential lead vehicles in a headway direction of the host vehicle.

11 Claims, 19 Drawing Sheets

U.S. PATENT DOCUMENTS

| | | | |
|---|---|---|---|
| 6,990,253 B2* | 1/2006 | Takeda et al. | 382/276 |
| 7,437,243 B2* | 10/2008 | Fujimoto | 701/300 |
| 7,545,956 B2* | 6/2009 | Miyahara | 382/106 |
| 7,561,720 B2* | 7/2009 | Miyahara | 382/104 |
| 7,561,721 B2* | 7/2009 | Miyahara | 382/104 |
| 7,623,681 B2* | 11/2009 | Miyahara | 382/104 |
| 2004/0098196 A1* | 5/2004 | Sekiguchi | 701/301 |
| 2004/0169840 A1 | 9/2004 | Hoashi et al. | |
| 2005/0102070 A1 | 5/2005 | Takahama et al. | |
| 2005/0159876 A1* | 7/2005 | Sugano | 701/96 |
| 2005/0273262 A1 | 12/2005 | Kawakami et al. | |
| 2006/0002587 A1* | 1/2006 | Takahama et al. | 382/103 |
| 2009/0060273 A1* | 3/2009 | Stephan et al. | 382/103 |

OTHER PUBLICATIONS

International Search Report dated Feb. 27, 2008.

* cited by examiner

APPARATUS AND METHOD FOR OBJECT DETECTION AND TRACKING AND ROADWAY AWARENESS USING STEREO CAMERAS

CROSS-REFERENCE TO RELATED APPLICATIONS

This application claims the benefit of U.S. Provisional Patent Application No 60/794,064, filed Apr. 21, 2006, which is hereby incorporated by reference in its entirety.

BACKGROUND OF THE INVENTION

1. Field of the Invention

The present invention relates generally to a stereopsis-based application. More particularly, the present invention is directed to an apparatus and method for detecting and tracking objects within corresponding detected roadway features utilizing a stereo vision configuration, thereby enabling and improving applications in autonomous systems for vehicular control.

2. Description of the Related Art

Developments in the field of computer vision and the availability of processors with increased processing speeds and multitasking capabilities have led to new and improved video-based technologies, but it has not been until only in the past few years that these developments have begun to appear in automotive applications, such as collision avoidance systems having adaptive control capabilities.

One such system that is increasingly becoming available in vehicular collision avoidance systems is adaptive cruise control (ACC), which has also been commonly referred to as active, automatic, autonomous and intelligent cruise control. ACC is similar to conventional cruise control systems in that they assist in maintaining a host vehicle's pre-set cruise speed. However, unlike conventional cruise control systems, ACC systems are configured to automatically adjust (e.g., by braking or increasing throttle) the pre-set speed of a vehicle in response to the detection of target vehicles that may enter into and impede the path of travel of the host vehicle, thereby automatically regulating the speed of the host vehicle absent voluntary actions by a driver.

Modern ACC systems, as well as other collision avoidance systems, have been known to employ the use of a headway sensor, a digital signal processor, longitudinal controller and other similar sensor and controller components coupled together for regulating separation distance between vehicles, vehicular speed and detection of drift or departing from a tracked lane of travel by a host vehicle. In ACC systems, for example, these sensors are typically housed in a front body portion of a host vehicle and are positioned to detect vehicles ahead of the host vehicle's line of travel. Information collected by these sensors are processed and supplied to the controller, which then regulates the corresponding host vehicle's throttle and braking units accordingly. If a lead vehicle in the same lane (i.e., the target vehicle) slows down or enters the lane of the host vehicle, the system sends a signal to the engine or braking units of the host vehicle to decelerate proportionally to sensor readings. Similarly, when the lane becomes clear, or the lead vehicle entering the lane accelerates, the system will re-accelerate the host vehicle back to the desired pre-set cruise speed.

Monocular vision, radar, monocular vision with radar, stereo vision with radar and lasers have all been used in enabling the sensory requirements of collision avoidance systems. Those commonly used in today's ACC systems, for example employ radar-based or laser-based sensors. Radar-based sensors bounce microwaves off the target vehicle, while laser-based sensors read light reflected off the body of the vehicle ahead. Radar-based sensors provide a slight advantage over laser-based systems in that they are unaffected by unfavorable weather conditions, such as dense fog, snow and rain. Radar-based sensors also perform better when used on target vehicles that are extremely dirty (which severely inhibits the ability to reflect light back to the laser-based sensor). However, a considerable disadvantage of radar-based sensors over laser-based sensors is their cost.

Accordingly, there exists a need to provide a more cost-effective and reliable means for detecting and tracking objects for use in vehicular collision avoidance systems.

SUMMARY OF THE INVENTION

In view of the foregoing, it is an object of the present invention to provide a collision avoidance system enabled by input of a scene image received solely from a vision-based stereo configuration, thereby eliminating costly sensory based components and providing a performance-enhanced approach to vehicle detection and tracking.

It is another object of the present invention to provide a collision avoidance system enabled to receive a focused estimation of three dimensional structures and regions, as well as detailed scene context relating to the immediate headway of a vehicle.

It is yet another object of the present invention to provide a collision avoidance system enabled with a means for rejecting spurious scene image data and increasing system reliability.

In accordance with the aforementioned objectives of the present invention, provided and described herein is a collision avoidance apparatus employing novel stereo vision applications for adaptive vehicular control. To satisfy the detection requirements for employing the collision avoidance apparatus of the present invention, two major stereo vision processing functions are provided, a road detection and awareness (RDA) algorithm and a vehicle detection and tracking (VDT) algorithm.

The RDA function makes use of three-dimensional point data, computed from received stereo image data, to locate the road surface ahead of the host vehicle. Once a set of image features that lie on the road surface are found, the RDA is configured to utilize the detected features to identify lane boundary markers that demarcate the edges of the road lane in which the host vehicle is traveling. Data computed by the RDA function is used to guide the VDT function, which provides lead vehicle motion data to the collision avoidance control system by using stereo image data to determine the depth of scene features ahead of the host vehicle, as well as making associations between the three-dimensional features so that they form groups that represent potential lead vehicle detections in the road ahead of the host vehicle. The VDT function is further configured to use information from the RDA function to compensate for pitching motion of the host vehicle, and to direct the search for potential detections to concentrate on the lane ahead of the host vehicle.

A number of target confirmation functions, based upon 3D features, image content and temporal consistency, are used with the RDA and VDT functions to verify potential detections so that only those potential detections that correspond to real vehicles are used to provide information to the collision avoidance control system. For confirmed detections, a spatio-temporal tracking function is used to estimate the forward and lateral motion of the lead vehicle with respect to the host vehicle, information of which is transmitted to the collision avoidance control system in order to ultimately regulate the host vehicle's speed.

The most visible advantages of the present invention is that of performance and cost. The integration of stereo vision sensing in the present invention provides a more reliable three-dimensional estimation of a target vehicle structure than a monocular system alone, and can provide more scene context than a radar system alone. Moreover, it is less costly than the combination of an ACC radar and a monocular vision system, and offers a more straightforward integration solution than a multi-sensor system.

These and other objects are accomplished in accordance with the principles of the present invention, wherein the novelty of the present invention will become apparent from the following detailed description and appended claims.

BRIEF DESCRIPTION OF THE DRAWINGS

The above and other objects and advantages of the present invention will become apparent upon consideration of the following detailed description, taken in conjunction with the accompanying illustrative drawings, which are provided for exemplary purposes to assist in an understanding of the present invention described herein, and in which like reference characters refer to like parts throughout, wherein.

DETAILED DESCRIPTION OF THE PREFERRED EMBODIMENTS

Figure 1:
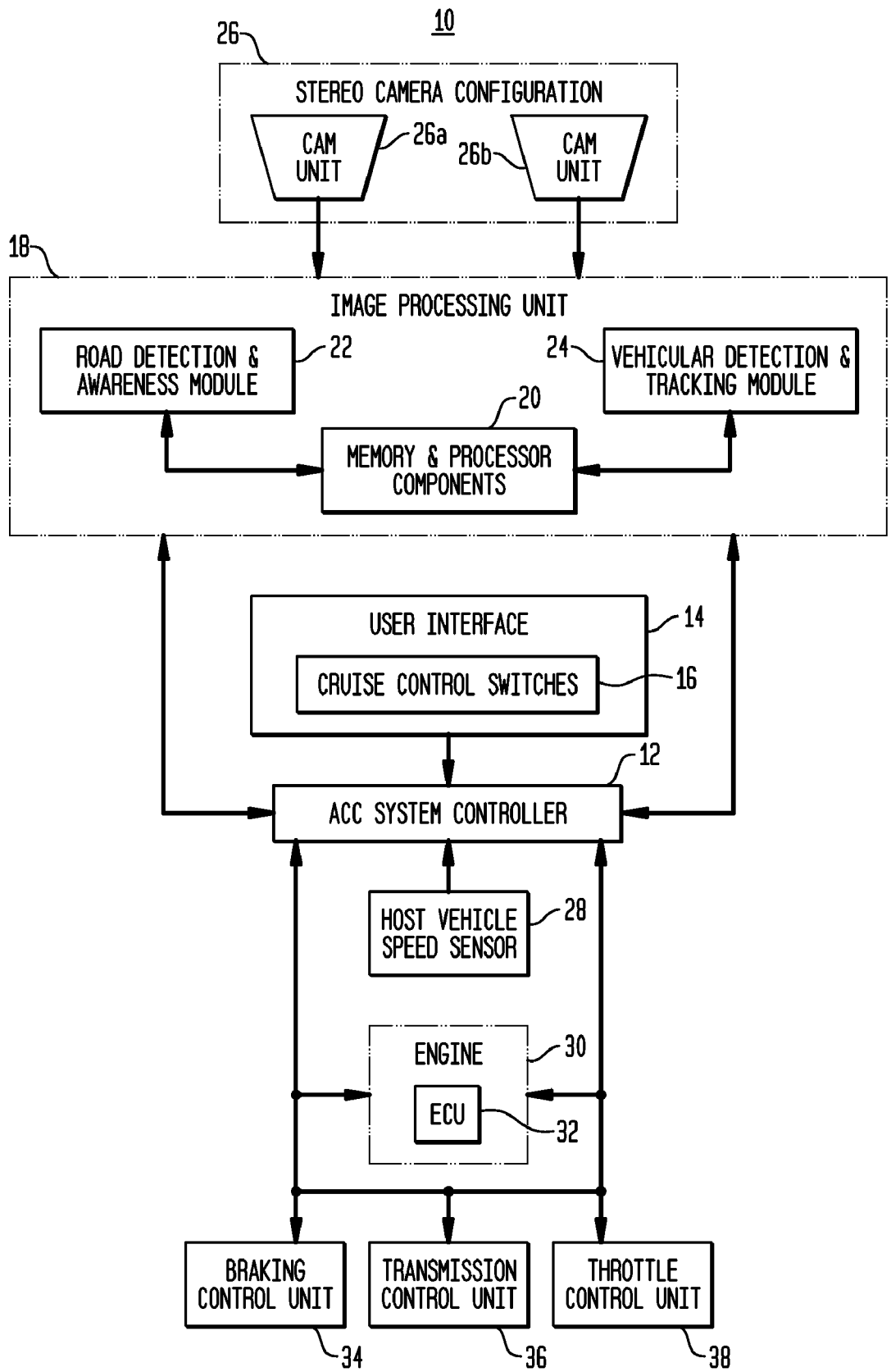
FIG. 1 illustrates an autonomous collision avoidance apparatus employing a stereo vision-based configuration in accordance with an embodiment of the present invention.

The present invention is directed towards an apparatus and method for enabling adaptive vehicular systems employing solely the use of stereo cameras for detection and tracking applications. For purposes of clarity, and not by way of limitation, illustrative views of the present invention are described herein with references being made to the aforementioned drawing figures. The following detailed description in conjunction with the referenced figures are provided to enable and assist in the understanding of the present invention and, as such, the drawing figures should not be deemed to be exhaustive of all the various modifications obvious to one skilled in the art. Such obvious modifications are deemed to be well within the spirit and scope of the present invention.

An autonomous collision avoidance apparatus 10 is illustrated in FIG. 1. In accordance with a preferred embodiment of the present invention, an adaptive cruise control (ACC) system is depicted in connection with the illustrated autonomous collision avoidance apparatus 10 to better exemplify the detection and tracking applications of the present invention. The detection and tracking applications of the stereo vision configurations employed in the present invention can be modified accordingly by one skilled in the art to enable additional active and passive collision avoidance or collision mitigation systems.

In FIG. 1, autonomous collision avoidance apparatus 10 is comprised of an ACC system controller 12, which is coupled to a user interface 14 having cruise control switches 16 for activating and deactivating cruise control features controlled by ACC system controller 12. Switches 16 may be integrated, for example, along an unobtrusive portion of a vehicle's steering wheel (not shown), thereby providing a driver with ease of access for employing or disabling ACC features of the vehicle.

ACC system controller 12 is further coupled to an image processing unit 18. Image processing unit 18 is comprised of a memory and processor components section 20. Memory and processor components section 20 may include an image preprocessor, a central processing unit (CPU), a analog-to-digital converter (ADC), read-only memory (ROM), random access memory (RAM), video random access memory (VRAM), other necessary image processing and support circuitry or any combination thereof. For example, an image preprocessor may be integrated into image processing unit 18 as a single chip video processor; such as Acadia™ I developed by Pyramid Vision Technologies, a subsidiary of Sarnoff Corporation in Princeton, N.J.

The CPU included in memory and processor components section 20 of image processing unit 18 may be comprised of any number of presently available high speed microcontrollers or microprocessors and supported, accordingly, by support circuits that are generally well known in the art. Such support circuits may include, for example, cache or any other suitable type of temporary storage area where frequently accessed data can be stored for quick access, power supplies, clock circuits, input-output interlaces and the like.

The aforementioned various types of memory, or combinations thereof, that may be incorporated in memory and processor components section 20 of image processing unit 18 may be used for storing certain software routines, collections of image data, databases of information and image processing software for processing collected image data and facilitating the present invention. Although the present invention is described herein primarily in the context of a series of method steps, these methods may similarly be performed by hardware, software or some suitable combination of both hardware and software.

As illustrated in FIG. 1, memory and processor components section 20 of image processing unit 18 may be coupled to stereo vision specific modules. The stereo vision modules are a road detection and awareness module 22 and a vehicular detection and tracking module 24, each being employed at various stages of processing of the collected stereo image data in order to facilitate the present invention. These modules, although illustrated as separate component modules, may be similarly be made available by accessing their related algorithms from memory components in memory and processor section 20. The specific computational processes employed in connection with these two modules are described in further detail herein.

When the cruise control features of a host vehicle (i.e., the trailing vehicle equipped with ACC system controller 12) are activated, autonomous collision avoidance apparatus 10 begins receiving input image data from stereo camera configuration 26. Camera configuration 26 is comprised of a pair of stereo cameras, a first camera unit 26*a* and a second camera unit 26*b*. Camera units 26*a* and 26*b* are preferably in a side-by-side configuration, having a known relation to one another and securely affixed in a suitable headway position of the host vehicle such that they can produce a stereo image of a scene.

Camera units 26*i* and 26*b*, configured in a stereo pair configuration as shown in FIG. 1, are capable of providing vast three-dimensional information about a target object in the headway direction of the host vehicle, such as the presence of a target object, its corresponding distance from the host vehicle and its speed of travel. By combining image data received from both stereo camera units 26*a* and 26*b*, depth information for a particular scene that is typically lacking in a monocular image may be achieved by revealing the three-dimensional structure of the scene. This configuration provides a robust solution for detecting and tracking physical properties associated with moving objects.

ACC system controller 12 may also be further coupled to a speed sensor device 28 for tracking the speed of travel associated with the host vehicle. Speed sensor device 28 may be any speed sensor device or combination of components known to those skilled in the art for reliably tracking a range of speeds of travel typically associated with a moving vehicle. For example, sensors may be employed at the wheels of a moving vehicle and corresponding captured data reported back to ACC system controller 12 for executing applicable adjustments in speed as deemed necessary by ACC system controller 12.

Similar to the memory and processing components of image processing unit 18, ACC system controller 12 may generally be comprised of an input/output (I/O) interface, a microprocessor or a central processing unit (CPU) for processing data received from the I/O interface and executing commands in response to said processed data, and a plurality of memory type components for regulating and accessing stored data necessary for achieving the present invention. ACC system controller 12 is configured to receive input from image processing unit 18 in order to translate the detected image data and communicate, accordingly, with various vehicle control units, such as, engine 30 having an engine control unit (ECU) 32 that is likely configured to communicate correspondingly with a braking control unit 34, a transmission control unit 36 and a throttle control unit 38 of the host vehicle.

Image data related to the leading vehicle and its corresponding lane of travel is received from camera units 26*a* and 26*b* and processed using the detection and tracking modules 22 and 24 of image processing unit 18. The processed image data is then shared with ACC system controller 12 to determine the need for adjusting a driver's preset cruise speed of the host vehicle. If ACC system controller 12 determines that an adjustment in the host vehicle's speed is necessary, the appropriate control signals are transmitted to, for example, ECU 32. ECU 32 may be configured to communicate with all the essential control units of the host vehicle. In an alternative embodiments, which is typical in modern vehicles, a plurality of ECUs may be employed for controlling one or more of the subsystems and/or control units of a vehicle. For example, ECU 32 may be configured to communicate with and control the operation of throttle control unit 38 for regulating the fuel and air intake flow into engine 30. Similarly ECU 32 may be configured to communicate with and control the operation of braking control unit 34 so that a predetermined safe distance between vehicles may be achieved automatically by ACC system controller 12.

Figure 2:
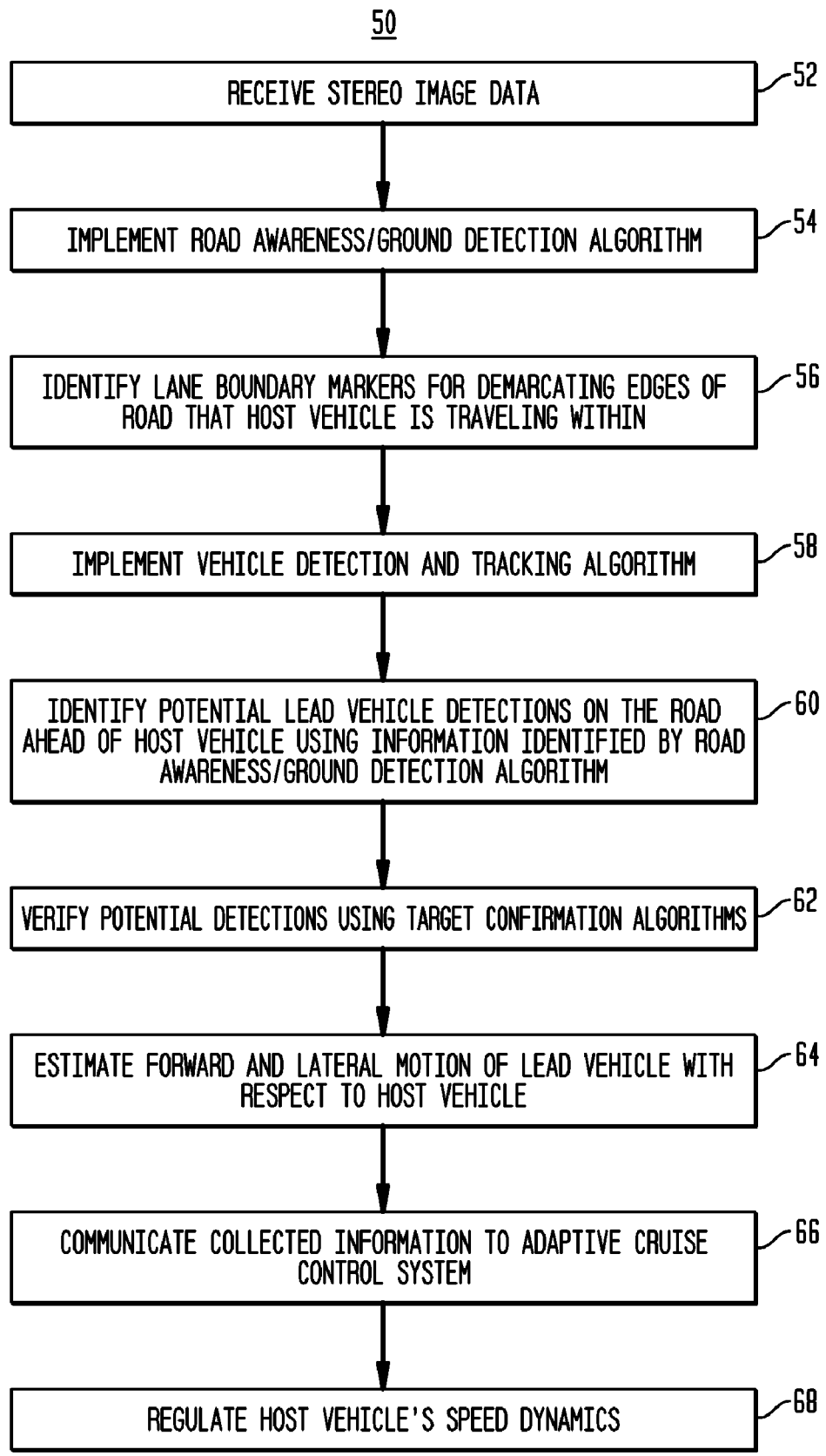
FIG. 2 illustrates a generalized flow diagram of the essential processes performed for roadway and object detection and tracking in accordance with an embodiment of the present invention.

A general overview of the processing stages implemented in connection with autonomous collision avoidance apparatus 10 is illustrated in the flow diagram of FIG. 2, with more elaborate descriptions of key processes further being provided herein. When the cruise control feature of a host vehicle is activated by a driver, for example, by setting a desired cruise speed using cruise control switches 16 provided on user interface 14, ACC system controller 12 and image processing unit 18 are enabled, thereby initiating the detection and tracking process 50 illustrated in FIG. 2. Process 50 begins by providing stereo image data collected by camera units 26*a* and 26*b* as input to image processing unit 18. Stereo image data received by image processing unit 18 is subjected to two major image computational functions to satisfy the sensing requirements necessary for robust functionality of autonomous collision avoidance apparatus 10. These image computational functions are accomplished primarily in connection with those processes describes in connection with modules 22 and 24 of image processing unit 18.

Stereo image data received by image processing unit 18, at step 52, is subject initially to a road awareness and ground detection algorithm, which is implemented at step 54. Implementation of this algorithm is used to identify, at step 56, lane boundary markers for demarcating edges of a road on which the host vehicle is traveling. While processing depictions of the road surface being traversed by the host vehicle, a vehicle detection and tracking algorithm is implemented at step 58 to identify at step 60, potential leading vehicle detections on the depicted road surface ahead of the host vehicle. Potential detections are verified, at step 62, using target confirmation algorithms. Thereafter, at step 64, forward and lateral motion of the leading vehicle with respect to the host vehicle is estimated and communicated, at step 66, to ACC system controller 12 of FIG. 1 in order to regulate, at step 68, the host vehicle's speed dynamics.

Road Detection and Awareness

Figure 3A:
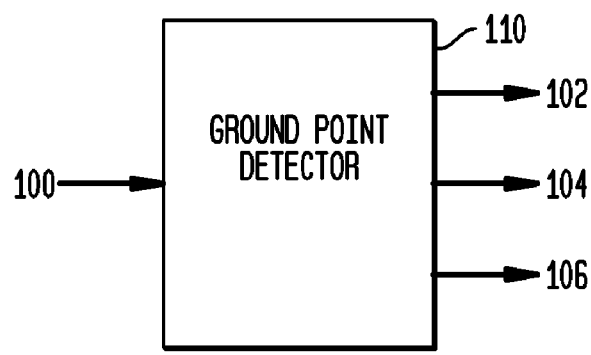
FIGS. 3A-3D illustrate functional block diagrams of the road awareness and ground detection function performed by an image processing portion of the autonomous collision avoidance apparatus in accordance with an embodiment of the present invention.

Road detection and awareness module 22 of image processing unit 18 operates essentially as a ground point detector 110, as illustrated in FIG. 3A, implementing the road detection and awareness (RDA) algorithm represented generally by module 22 illustrated in FIG. 1. The RDA algorithm makes use of three-dimensional point data computed by image processing unit 18 using stereo image data received from camera units 26a and 26b, to locate the road surface in the headway direction of the host vehicle. Once a set image features that lie on the road surface are found, the RDA algorithm goes on to identify lane boundary markers that demarcate the edges of the road lane in which the host vehicle is traveling within. Determinations made by the RDA algorithm are used to guide the vehicle detection and tracking algorithm represented generally by module 24 illustrated in FIG. 1 (to be described in further detail herein). Road awareness data additionally may be used to compensate for pitching motion of the host vehicle and to judge when either the host or tracked lead vehicle changes into an adjacent lane or is going around a curve along the detected road surface.

Ground point detector 110 depicted in FIG. 3A receives input image data 100 from stereo camera units 26a and 26b, as illustrated in FIG. 1, and provides for matched features 102, a ground model 104 and a lane model 106. Matched features 102 are a set of features that have been matched in the left and right images provided, respectively, by each of camera units 26a and 26b, to obtain three-dimensional X, Y and Z coordinates. This three-dimensional point cloud is further analyzed to determine which points lie on the ground, to provide ground model 104, and which features are likely to be lane markers, to provide lane model 106. The lane center can be determined upon identification of those features that represent lane markers. In an alternative embodiment, the three-dimensional points could be organized into vertical and horizontal clusters before locating the road surface, and then a road model could be fit thorough the appropriate horizontal clusters.

Figure 3B:
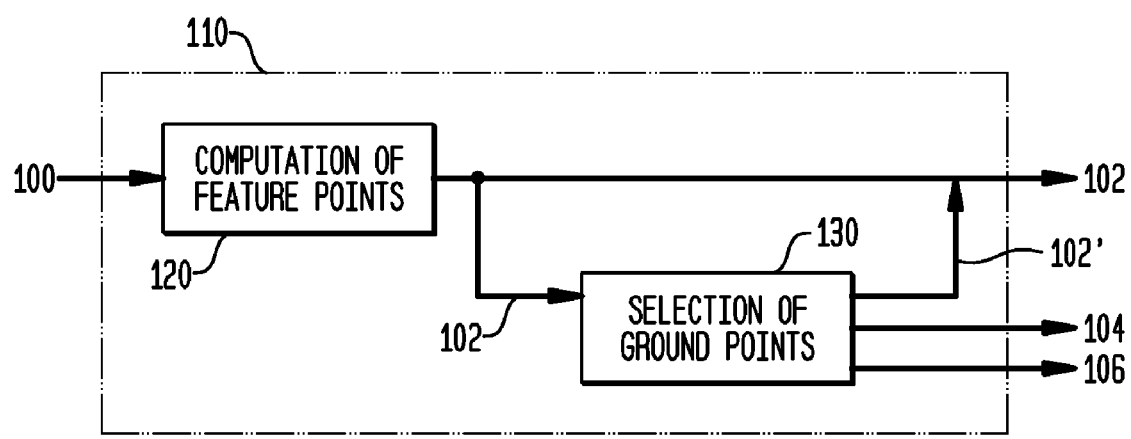

Obtaining a set of features is a separate task from analyzing the features to find the required road and lane markings. FIG. 3B depicts the separate tasks executed by ground point detector 110 of FIG. 3A, which provides for a computational block 120 for computing feature points and a computational block 130 for selecting corresponding ground points. These two separate tasks are illustrated by the functions of computational blocks 120 and 130, where computation of matched feature points 102 are processed from input 100 of the left and right stereo image data received by computational block 120 and where selection of ground points is further processed in computational block 130 using matched feature points 102 output by computational block 120. The selection of ground points by computational block 130 contributes to yielding ground model 104, lane model 106 and annotated features 102', which supplement the initial output matched features 102.

To compute feature points, computational block 120 processes the left and right images received from stereo camera units 26a and 26b one line at a time. On each line processed, intervals (e.g. on the order of 8 pixels wide) with significant intensity variation are found and then matched in the left and right lines to obtain the disparity for detected three-dimensional features.

Figure 3C:
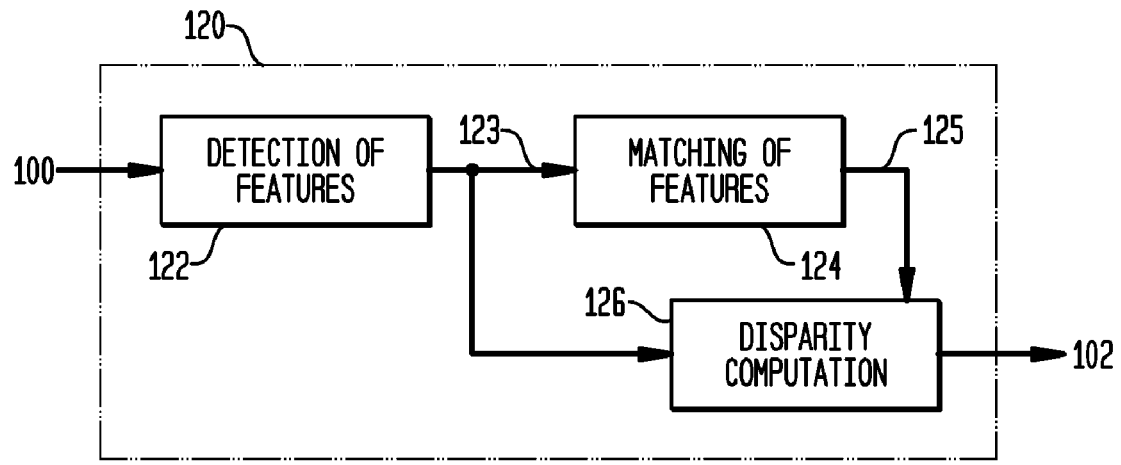

FIG. 3C illustrates the necessary functions employed by computational block 120 for obtaining the three-dimensional point features. In feature detection block 122 a derivative image is obtained, and regions with high gradients are identified as candidates for feature matching. However, a problem experienced with the derivative image test is its locality. For example, an intensity change of 70 over an 8 pixel width (i.e., 100 110 120 130 140 150 160 170) could result in the sane derivative score as a random variation that includes a 10-pixel intensity change (e.g. 110 114 104 111 107 109 107 109 107 114), even though the first pattern describes a more obvious intensity variation. Therefore, when searching for features in the present invention that are likely to result in a reliable match, particular criteria is employed to give this first pattern a much higher score than that of the second pattern. By computing the difference in maximum and minimum intensities for a set of pixels strong features can be isolated, however, this may also result in sensitivity to spurious intensity variations. The RDA algorithm employed in the present invention is configured to compute the difference of second and next-to-last values in a sorted list of intensities, thereby providing a measure that yields more robust results while minimizing spurious intensity variations.

Line features 123 are passed to a feature matching block 124, wherein the features being matched are actually intervals having the occurrence of a significant intensity variation. An interval begins when the next 8 pixels have a significant intensity variation and it ends when the next 8 pixels are relatively constant in their intensity variation. Ideally, corresponding features should have intensity profiles that match when starting points are aligned. In practice, sum of absolute difference (SAD) scores are computed for the nominal alignment ±3 pixels and the true alignment to sub-pixel precision is estimated by fitting a parabola through the lowest SAD scores.

Note that matching features may not have the same width. For example, consider a situation where rising and falling edges are grouped as one feature in one image, while in the other imitate the top of the profile is wide enough and flat enough that rising and failing edges are separate features. To address such a situation, the RDA algorithm selects the larger of the two widths, at feature matching block 124, for the SAD interval used to align the intervals. In the current example, the single wide profile will match the feature for the rising edge and include the falling edge as well because the width of the single wide feature will be used in the match. The separate falling edge will not match anything and, therefore, will be discarded.

Since response to light of stereo camera units 26a and 26b may differ (e.g., due to different aperture settings), it may be necessary to make the matching scheme of the RDA algorithm employed at feature matching block 124 insensitive to differences in the overall intensity gain and offset. In particular, an intensity shift is permitted between matching patterns by computing the algebraic average difference between the two intensity patterns, and then computing the sum of the absolute value of the difference in intensity minus the average difference.

When looking for candidate matching features, a search range is computed to rule out some candidates because with reasonable camera geometry and orientation the proposed disparity could never occur. Detected line features 123 determined by feature detection Nock 122 and matched features 125 determined by feature matching block 124 are passed to a disparity computation block 126 to be used for computing the disparity for corresponding points. The disparity for corresponding points is defined as $\delta = x_R - x_L$, where in the absence of image shifts or affine transformations the range is given by $$Z = -\frac{bf_\delta}{\delta}.$$

Since the RDA algorithm has to deal with "warped" images, it also needs to take into account the possibility of an affine shift and/or an Acadia preshift. These shifts affect the right image and aforementioned search range and, as such, may be defined in an ASP file that may be stored, for example, in memory and processor components section 20 of image processing unit 18.

Figure 3D:
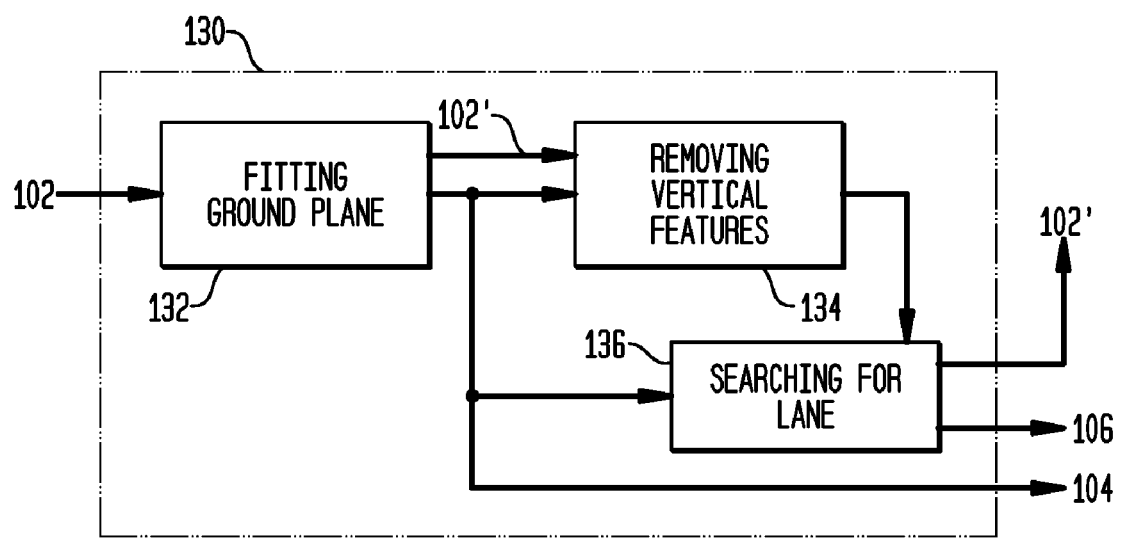
Figure 4A:
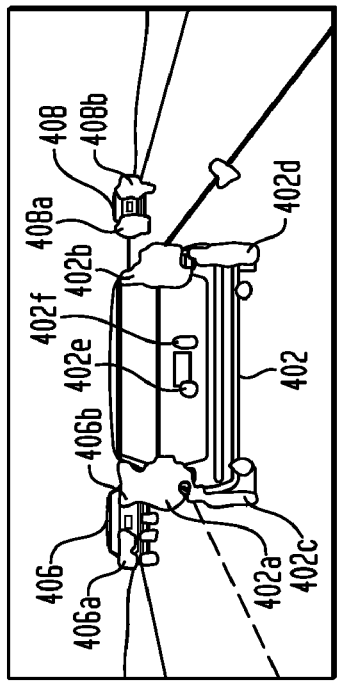
FIGS. 4A and 4B illustrate a left and right stereo image scene of lead vehicles with detected edges in accordance with an embodiment of the present invention.
Figure 4B:
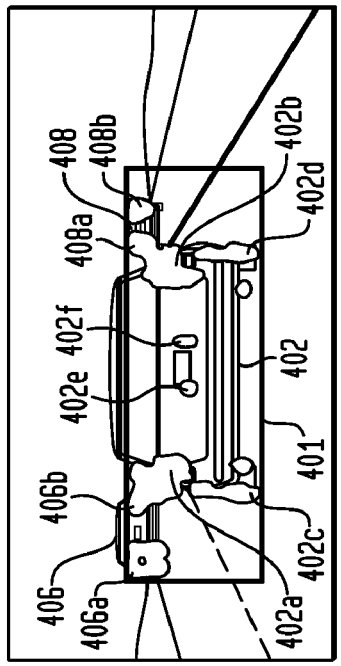

Feature points output by computational block 120 may then be provided as input to computational block 130 of ground point detector 110 for selecting the corresponding ground points. This procedure includes both a search for the ground plane and a search for the lane. The ground plane is needed to supply outputs that provide the row of the image on which the ground plane will project for a particular depth. The search for the lane provides information that determines for a given row of the image, the column where the left lane boundary, right lane boundary and lane center will be located. FIG. 3D illustrates the necessary functions employed by computational block 130 for finding the ground and lane markers.

The ground plane search assumes that we have a good estimate for the height at which stereo camera units 26a and 26b are fixed. What is not known is the pitch angle between fixed stereo camera units 26a and 26b and the road, which can vary by several degrees. In one embodiment, the ground plane scheme of the RDA algorithm employed by computational block 130 may provide a histogram of the slopes that exist between the point Y (the camera height), Z=0 and feature points Y, Z. In an alternative embodiment, the RDA algorithm employed by computational block 130 may provide a ground plane scheme that forms a two-dimensional histogram of y, d values (image y and disparity) to use in searching for the ground. In either approach, the challenge is finding the "onset" of ground points, rejecting spurious below-ground points and also rejecting above-ground points. Yet, there may be more above-ground points than ground points and, therefore, one cannot simply look for a peak in the histograms. However, if vertical structures could be eliminated, which are typically identifiable by the clustering of points, then the remaining above-ground horizontal features (e.g., the top of a highway road barrier) may be rare enough that the first peak in a suitable histogram can be selected with confidence of detecting the ground.

A three-dimensional point cloud will likely have spurious below-ground points as well as legitimate above-ground points from cars and road-side (objects. For points on the ground, we expect y to be a linear function of disparity. In a typical plot of y versus disparity, the slope of the line is determined by the camera height. The intercept at zero disparity gives the location of the horizon in the image, and is related to the slope of the ground relative to the camera axis.

For a particular disparity value (i.e., a particular range), a y value that is likely to be near the ground must be found. In one embodiment, the RDA algorithm starts with y equal to the image height (i.e., start from the bottom of the image) and searches through the histogram until a bin with a count exceeding some threshold is found. The set of y, d values obtained in this way may then be analyzed by making a histogram of horizon values. That is, for each y, d value, the corresponding y_horizon is computed, assuming that the ground plane has no roll, the height of stereo camera units 26a and 26b are known and the plane passes through the y, d point. The y_horizon histogram for a good set of y, d points will exhibit a peak at the location of the horizon, and will have relatively few horizon predictions from below-ground points. The difficulty, however, is that the threshold required to obtain a good set of y, d points is points not known. Therefore, the RDA algorithm starts with a zero threshold and increases it until a good set of points are obtained, presumably because spurious ground points lave been eliminated. An alternative to searching for y_horizon may be to employ a search for the slope of the ground plane relative to the camera axis.

For the present analysis it is assumed that in camera coordinates the ground plane is described by:

$$Y(Z) = Y_0 - sZ$$

The usual coordinate system is applied where positive Y is down. If the ground pitches up, then the slope(s) is positive and Y becomes increasingly more negative as one moves away from stereo camera units 26a and 26b.

Alternatively, the ground plane can be described by expressing disparity as a function of the image coordinate y, thereby giving the camera projection $$y = f_y \frac{Y}{Z} + c_y$$

and the stereo equation gives $$\delta \equiv x_R - x_L = -\frac{bf_x}{Z}$$

For points in the ground plane, we have $$y = f_y \frac{Y_0 - sZ}{Z} + c_y$$
$$= (c_y - sf_y) + f_y \frac{Y_0}{Z}$$
$$= (c_y - sf_y) + \frac{Y_0 f_y}{bf_x}(-\delta)$$

Inverting this equation gives $$-\delta = \frac{bf_x}{Y_0 f_y}\{y + (sf_y - c_y)\}$$

Comparing this equation with the general form of a plane:

$$-\delta = d_0 x + d_1 y + d_2$$

gives $$d_0 = 0, \; d_1 = \frac{bf_x}{Y_0 f_y}, \; d_2 = d_1(sf_y - c_y)$$

In terms of these coefficients, the equation $$y = (c_y - sf_y) + f_y \frac{Y_0}{Z}$$

becomes $$y = -\frac{d_2}{d_1} + \left(\frac{bf_x}{d_1}\right)\frac{1}{Z}$$

Thus, once reliable ground points have been identified, the ground plane parameters are refined, at a ground plane fitting block 132, by fitting a line or pane to the ground points. The processes executed in ground plane fitting block 132 produces coefficients d0, d1, d2 in the expression d(x,y=d0(x−cx)+d1y+d2 for disparity as a of image x,y for points in the ground. In an effort to get a more accurate horizon estimate, distant ground points are weighted more heavily than ground points that are hereafter. Thereafter, vertical features associated with the ground plane fitted points are removed at a vertical feature removal block 134. This procedure relies on knowing which points are above ground and seeks to remove the foot-print, on the ground, of an above-ground feature. In an alternative embodiment, if the RDA algorithm were modified so that it only relied on finding sets of points with a large Y extent, then it could precede the ground detection.

After vertical features are removed, the RDA algorithm proceeds to a lane searching block 136. Lane detection relies on searching for ground features that appear to line up when viewed from the proper X position and direction in the X-Z plane. Detecting lane markers on a curve is also a critical, additional requirement and, theretofore, autonomous collision avoidance apparatus 10 may also employ the use of an external sensor (not shown). The external sensor may be used to estimate the vehicle yaw rate and, hence, the curvature of the lane.

The search for lane markers tries a discrete set of slopes. For each slope, lane searching block 136 computes the X intercepts at Z=0 for a line through the point with the specified slope. A histogram of X intercepts is constructed for each trial slope, the result being a two-dimensional position-slope histogram. The histogram is smoothed in X, to mitigate effects due to the alignment of bin boundaries with the actual lane locations. The overall peak location gives the position and slope of the lane hypothesis that best represents the data. This peak represents one lane. Histogram cells near this first peak are then ignored, and a second peak is sound corresponding to the second lane. To improve sensitivity to distant lane markers, the values in the histogram are weighted by distance.

As described above, the RDA algorithm analyzes the lane points in x, y image coordinates. In an alternative embodiment, the RDA algorithm, which includes a curvature correction, may build a lane model in X, Z coordinates. This may be done by clustering points belonging to each lane into nodes. The points are binned in Z, and regions of high density are identified as clusters. Clustered points are removed from the set and the process is repeated until all the points have been assigned to a cluster. The nodes are used to construct polylines. In addition, some curve-fitting is used to allow extrapolation off the ends of the lines, and to reduce the effect of kinks that occur when non-lane points (such as shadows or tires) happen to be included in the set of lane points.

When based on image coordinates x, y, the slope is computed between successive nodes and fitted as a function of y, giving node coordinates $(x_k, y_k)$ that are fit to a function of the form $s(y)=s_0+s_1 y$ where s=dx/dy. At least two nodes are required, but if there are exactly two nodes, then slope is set as $s_1=0$ and computed as follows:

$$s_0 = \frac{x_1 - x_0}{y_1 - y_0}$$

If there are three nodes then the curvature estimate is assumed to be unreliable and only the slope is estimated. In this case, the slope is estimated by fitting a line:

$$x=x_k+x_0 y$$

The least squares equations are $$\begin{pmatrix} \sum x_k \\ \sum x_k y_k \end{pmatrix} = \begin{pmatrix} N & \sum y_k \\ \sum y_k & \sum y_k^2 \end{pmatrix} \begin{pmatrix} x_0 \\ s_0 \end{pmatrix}$$

If the calculation is done using $\Delta y = y - \bar{y}$, then the matrix is diagonal and $$s_0 = \frac{\sum x_k \Delta y_k}{\sum (\Delta y_k)^2}$$

Note that disregarding the curvature in these particular cases may be a mistake. Whether or not to estimate curvature with only three points will depend on the means employed for generating the nodes, as well as the noise associated with each of the nodes. If there are more than three points, then slopes $$s_k = \frac{x_{k+1} - x_k}{y_{k+1} - y_k}$$

are associated with y values $$\hat{y}_k = \frac{y_{k+1} + y_k}{2}.$$

These (s, y) values are weighted to favor observations near the median slope:

$$w_k = \exp\left(-2\frac{(s_k - s_{median})^2}{\kappa}\right)$$

where κ is the "kink slope threshold." The usual least squares equations are solved to obtain the slopes $s_0$ and $s_1$.

In the case of a curved road, two additional steps may be taken in the search for lane boundaries. The first of these extra steps depends on whether or not the vehicle speed and yaw-rate are available. If so, then the road curvature can be estimated by dividing the velocity by the yaw-rate. The estimated curvature may then be used during the construction of the Xs histogram, where the location of individual X, Z points are corrected by subtracting away the X offset due to curvature prior to entering the point into the histogram. This allows the slope and offset of lane markers to be estimated in the presence of the road curvature and, hence, the clustering of image features into nodes for each lane marker. The other step may utilize, in place of a least-squares fit of a straight line to the lane marker node points, a quadratic equation of the form $X(Z)=X0+sX+C0/2*Z*Z$, where C0 is the road curvature. Both individual quadratic fits to the left and right markers, and a fit where slope s and curvature CO are shared by both left and right markers, are valid alternatives for this procedure.

As depicted in FIG. 3B, the present invention decomposes the problem of road detection and awareness into two major tasks, namely computation of feature points and selection of ground points. However, there is no explicit incorporation of a task for the aggregation of individual three-dimensional points into groups of nearby points representing objects, such as lane markers or cars, in the world. Thus, in an alternative embodiment, the RDA algorithm may be further configured to employ a scheme that bins three-dimensional points on a 0.5 m by 0.5 m grid or, alternatively, a 1 m by 1 m grid, covering a region Z=0 to 100 and the corresponding X width range (something on the order of 10,000 cells), thereby enabling the algorithm to find "islands" where adjacent cells in a particular direction (e.g., N-E-S-W or NE-SE-SW-NW) are occupied.

Islands determined to exceed 5 m in X or Z (e.g., a continuous lane marker that generates a large cluster) could be subdivided. Then, for each cluster, a histogram of y values could be generated with a resolution of about 0.2 m, wherein the histogram is subsequently filtered to mitigate effects due to how bins may be lined up with data and to locate a well-defined peak. Points can be added in the peak to a list of "horizontal" points to use in finding the ground. Once the ground is found, the set of horizontal points could be further refined to get ground points for use in finding lanes. Cluster labels may then be used to keep points grouped together and aggregate properties of the clusters, instead of individual points, may be used. In this way, the clusters may be used to help address potential near-far weighting problems. A near lane marker and a far lane marker will both be represented by one cluster, even though the near cluster is formed from many more points.

Vehicle Detection and Tracking

Vehicle detection and tracking module 24 of image processing unit 18 implements the vehicle detection and tracking (VDT) algorithm, which provides lead vehicle motion data to ACC system controller 12. The VDT algorithm uses stereo image data received from camera units 26a and 26b to determine the depth of scene features ahead of the host vehicle, and then makes associations between these three-dimensional features so that groups are formed representing potential lead vehicle detections on the road ahead of the host vehicle. As previously described, the VDT algorithm uses data processed by the RDA algorithm of module 22 to compensate for the pitching motion of the host vehicle, and to direct the search for potential detections to concentrate on the lane ahead of the host vehicle.

A number of target confirmation algorithms are used in connection with the VDT algorithm. The implementation of these algorithms are based upon three-dimensional features, image content and temporal consistency to verify potential detections, so that only those potential detections that correspond to real vehicles are used to provide information to ACC system controller 12. For a confirmed detection in the same lane as the host vehicle, which is determined to be the closest to the host vehicle, a spatio-temporal tracking algorithm is used to estimate the forward and lateral motion of the lead vehicle with respect to the host; this information is then also transmitted to ACC system controller 12 in order to regulate the host vehicle's speed. These aforementioned functional schemes employed by the VDT algorithm are described in connection with FIGS. 4-19, wherein FIGS. 4-14 are referenced for describing daytime execution of the VDT algorithm and FIGS. 15-19 are referenced for describing nighttime execution of the VDT algorithm.

For vehicle detection and tracking enabled during daylight hours, entire lead vehicle outlines are easily visible in the image received from stereo camera units 26a and 26b. The basic principle behind the daytime scheme of the VDT algorithm is that for a given region of space ahead of the host vehicle, vertical image features that could represent the outside edges of a vehicle are searched for. Such identifiable edge features are illustrated, for example, in FIGS. 4A and 4B, which corresponds respectively, to the left and right image views of stereo camera units 26a and 26b. As illustrated, edge features 402a-408b are identified, respectively, along the outside edges of lead vehicles 402, 406 and 408.

Edge features associated with lead vehicles are searched for within a region of interest (ROI) 401 predefined, for example, by the ground and lane models calculated in the previously described RDA algorithm. Edge features may be associated with the edges of taillights, wheels and license plates of a lead vehicle within ROI 401. For example, the nearest lead vehicle 402 to the host vehicle is detected within ROI 401 and has edge features identified along a left taillight 402a, a right taillight 402b, a left rear tire 402c, a right rear tire 402d, a left edge of the license plate 402e and a right edge of the license plate 402f.

Figure 5:
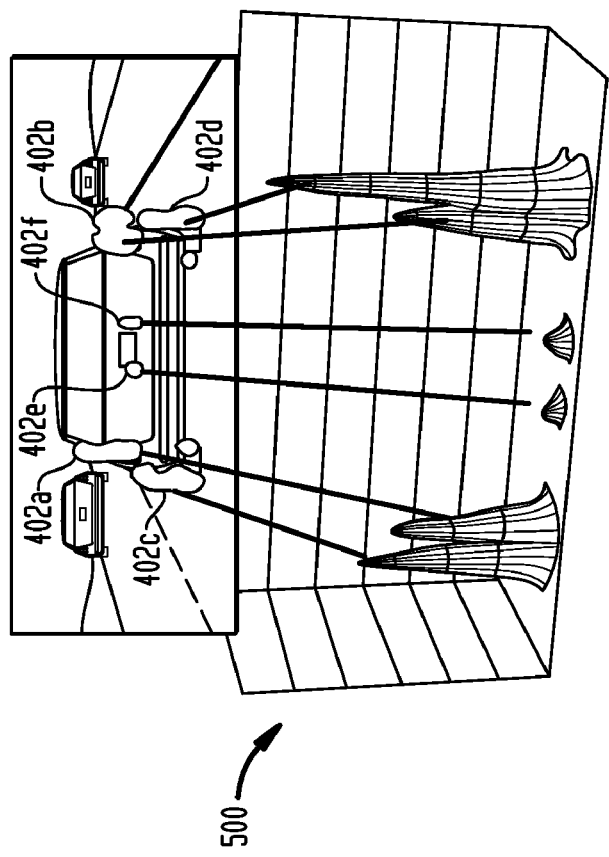
FIG. 5 illustrates an x-disparity histogram of the stereo image scene illustrated in FIGS. 4A and 4B in accordance with an embodiment of the present invention.

Once these vertical image features are identified, a stereo matching procedure may be performed to estimate the depth to the vertical image features. With the three-dimensional location of each of the vertical image features, a two-dimensional histogram 500, as illustrated in FIG. 5, of x (i.e., the corresponding column of the image where the feature is located) vs. D (the disparity of the feature) is constructed in order to cluster vertical features together.

The two peaks from histogram 500 that are most likely to be the outer edges of lead vehicle 402 in the image scene are then selected and a bounding box is drawn in the image scene around those features that are associated with the two peaks. The image contents of the bounded box are then subjected to a number of tests to confirm that the detected features actually belong to a vehicle. If confirmed as a vehicle, the output of the VDT algorithm will be the location (in X and Z) and the size (in width and height) of the detected lead vehicle.

Figure 6:
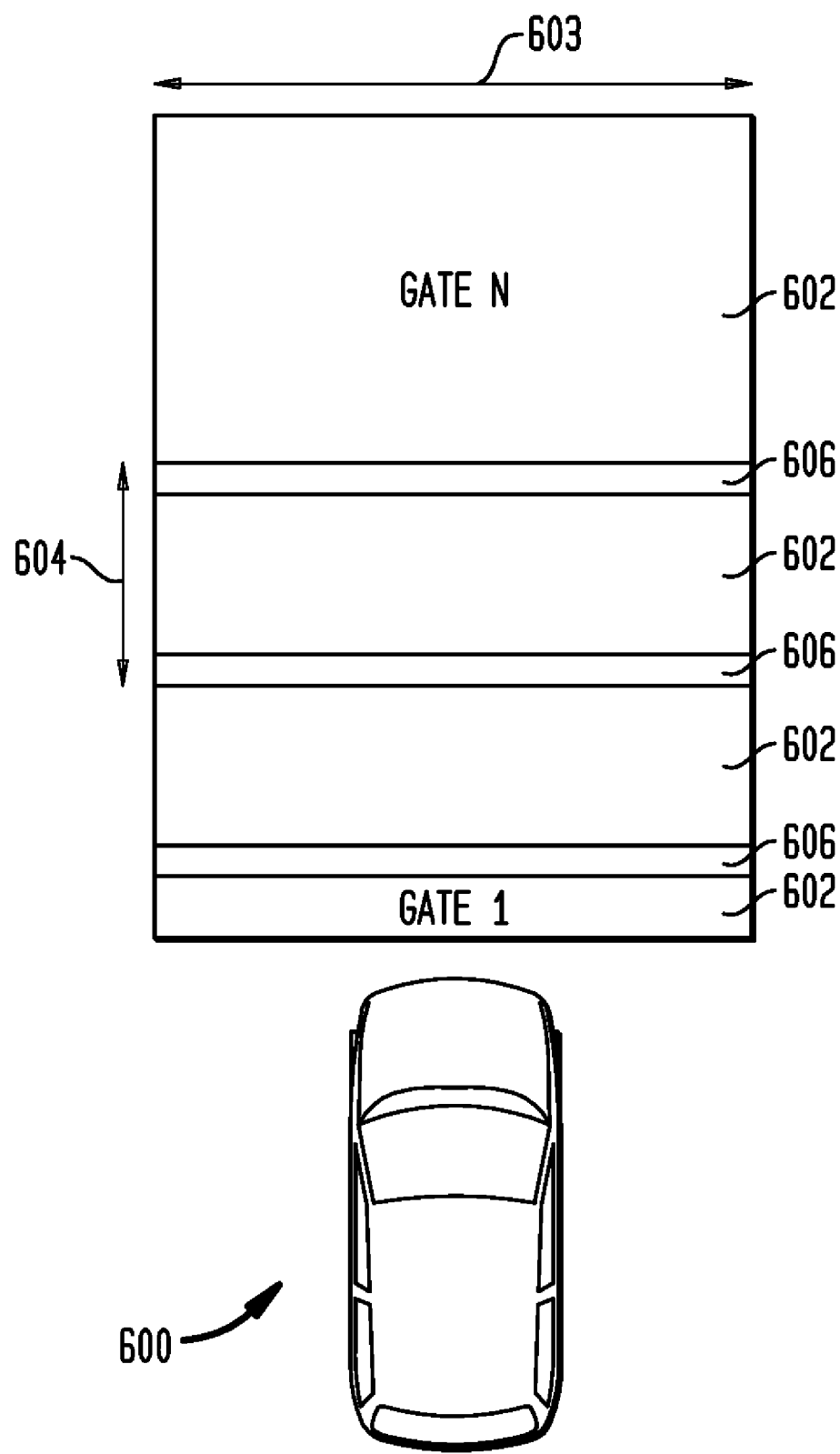
FIG. 6 illustrates detection gates in a lane ahead of a host vehicle in accordance with an embodiment of the present invention.

Referring to FIG. 6, during the initialization phase the VDT algorithm being employed in a host vehicle 600 searches for the previously described vehicle edge features in several regions of space, each region of space being referred to as a detection gate 602. Each of detection gates 602 specifies an ROI 603 and a depth range 604 in the image over which the search for lead vehicle edge features is performed. These detection gates are spread out along the length of the lane ahead of host vehicle 600, which is guided by the RDA algorithm, and each gate 602 slightly overlaps, as depicted by overlap regions 606, its adjacent neighbor gate.

Once the potential detection is confirmed to be a lead vehicle, then the tracking scheme of the VDT algorithm is deployed for tracking the lead vehicle. The tracking scheme of the VDT algorithm is similar to the detection scheme of the VDT algorithm, however, instead of the ROI being set by a fixed detection gate (in the image and in space), the location of the ROI at one instant (i.e., a current stereo pair image) is determined by the location of the ROI that was seen in the previous instant (i.e., the previous stereo pair image). During initialization the tracker will give the location and size of the lead vehicle, wherein the data is fed into a Kalman filter for estimating the range, range rate and acceleration of the lead vehicle with respect to the host vehicle, as well as the lateral position and lateral velocity of the lead vehicle with respect to the host vehicle.

To assist in a better understanding of the algorithms employed by the present invention, a more detailed analysis of the commutation engaged in by the VDT algorithm during a daytime search of an image scene having a lead vehicle, said scheme having already been overviewed in the preceding paragraphs, is described with reference to the process flows illustrated in FIGS. 7-14.

Figure 7:
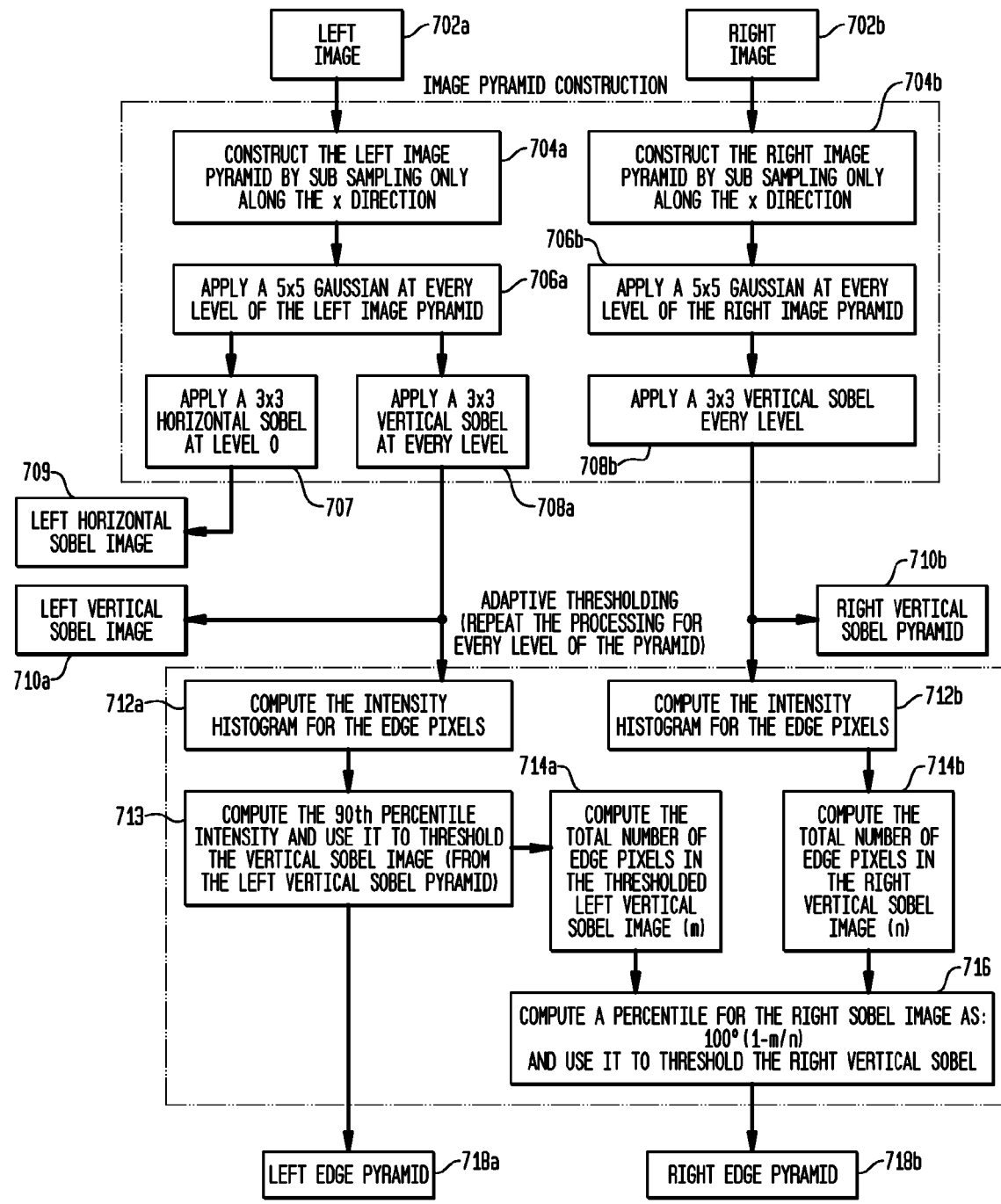
FIG. 7 illustrates a generalized flow diagram of the image pyramid construction and corresponding processing of stereo images in accordance with an embodiment of the present invention.

Referring to FIG. 7, image pyramid construction and processing is engaged in by the VDT algorithm for stereo image data received from stereo camera configuration 26, in which camera unit 26A provides, at step 702a, a left image view and camera unit 26b provides, at step 702b, a right image view. The two inputs are regions of interest (ROIs) from rectified left and right images received, respectively, from camera units 26a and 26b of stereo pair configuration 26. Thereafter, image pyramid construction of the received left and right image data is engaged, wherein left image and right image pyramids are constructed, respectively, at steps 704a and 704b, by subsampling only along the x-direction of their respective images. A 5×5 Gaussian filter is then applied, respectively, at steps 706a and 706b, at every level of the constructed left and right image pyramids, thereby filtering and forming a Gaussian pyramid. Thereafter, each level of the left and right Gaussian pyramids are subject to a 3×3 vertical Sobel application, respectively, at steps 708a and 708b, to compute Sobel edge images. The Sobel edge images are the candidate image features used for executing the vehicle detection scheme of the VDT algorithm. A 3×3 horizontal Sobel is also applied, at step 707, at level 0 of the left Gaussian pyramid generated at previous step 706a to provide a left horizontal Sobel image, at step 709. The horizontal edge image produced for the left image helps provide for a higher resolution image.

The left and right vertical Sobel pyramids are output, respectively, at steps 710a and 710b, and then subject to an adaptive thresholding scheme, wherein the most significant edges from the left and right image ROIs are selected. This computation is repeated for every level of the left and right Sobel pyramids. The adaptive thresholding scheme is initiated at steps 712a and 712b, computing the intensity histogram for the edge pixels associated, respectively, with the left and right vertical Sobel pyramids provided at steps 710a and 710b. The intensity histogram computed, at step 712a, for the left vertical Sobel pyramid is further subjected to a computation, at step 713 to determine the 90$^{th}$ percentile intensity to be used to threshold the vertical Sobel image. The computed 90$^{th}$ percentile intensity is then used to compute, at step 714a, the total number of edge pixels in the thresholded left vertical Sobel image (represented by a variable "m") and, similarly, at step 714b, the total number of edge pixels in the right vertical Sobel image represented by a variable "n"), is computed from the intensity histogram for the edge pixels computed, at step 712b, from the right vertical Sobel pyramid. The number of edge pixels in the left vertical Sobel image (m) and the right vertical Sobel image (n) may then be provided to computation step 716, wherein a percentile for the right Sobel image is computed as: 100*[1−(m/n)] and used to threshold the right vertical Sobel image. Computation of the percentile intensities and their application in thresholding the vertical Sobel images at steps 713 and 716 yield, respectively, at steps 718a and 718b, the left edge pyramid and right edge pyramid, which are the most significant edges from the left and right image ROIs previously discussed. The edge pyramids are binary images, where white corresponds to the significant edge pixels and black corresponds to all other pixels.

Figure 8:
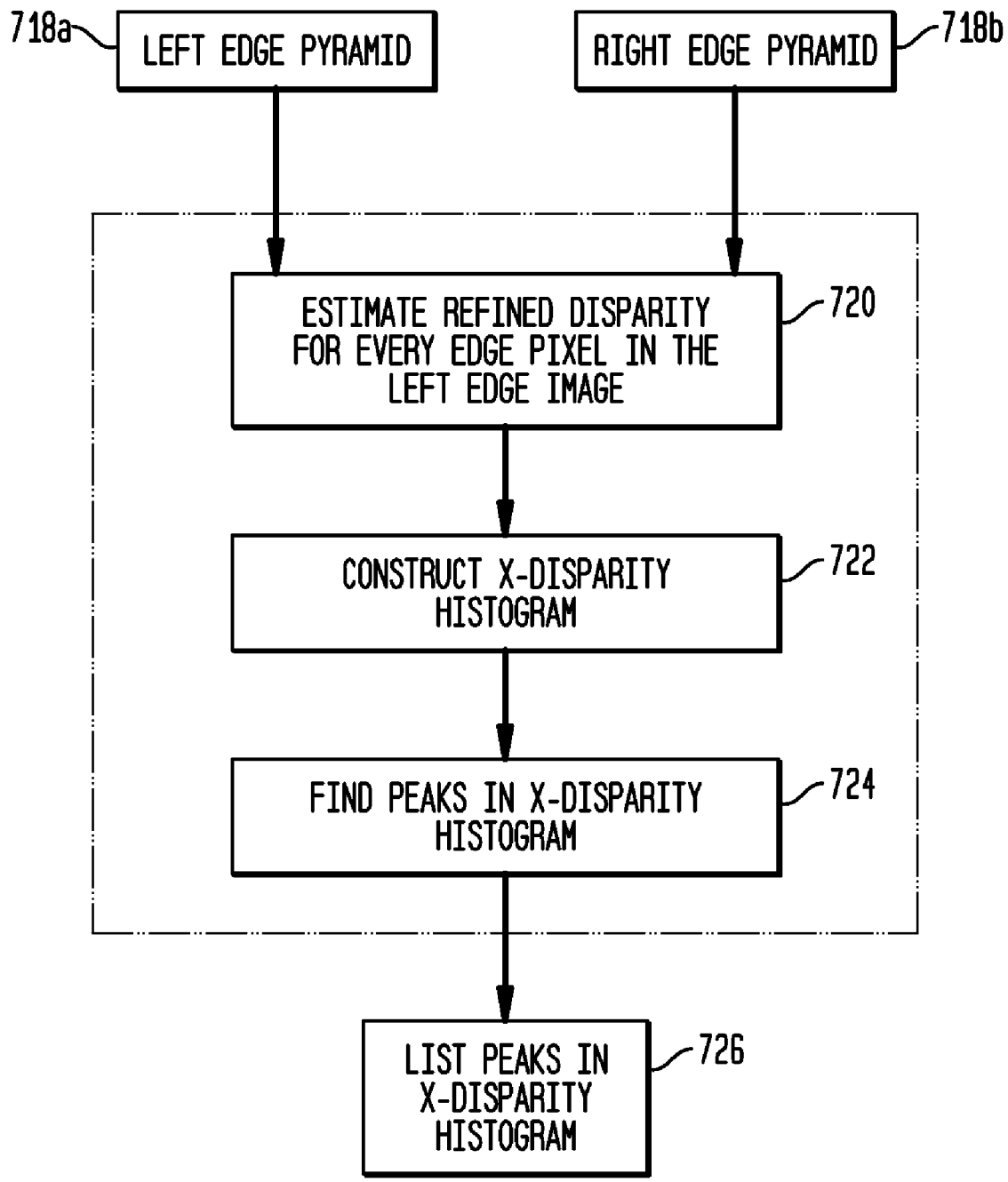
FIG. 8 illustrates a generalized flow diagram of the X-disparity construction and peak extraction processing in accordance with an embodiment of the present invention.

Once the left and right edge pyramids have been constructed, respectively, at steps 718a and 718b, the X-disparity scheme of FIG. 8 is initiated to construct an N-disparity histogram and extract relevant peaks. For the ROIs, a SAD-based stereo matching scheme is executed, at step 720, between the left and right Sobel pyramids for each pixel that is colored white in the left edge pyramid, yielding an estimated refined disparity for every edge pixel in the left edge image. Thereafter, at step 722, an X-disparity histogram is constructed rising the image X coordinates and the refined disparity values computed at step 720 for the edge pixels. Peaks are then located, at step 724, in the X-disparity histogram using a mean shift algorithm, thereby yielding, at step 726, a list of peaks (location and the pixels that contribute to those peaks) in the X-disparity histogram for every pyramid level.

Figure 9:
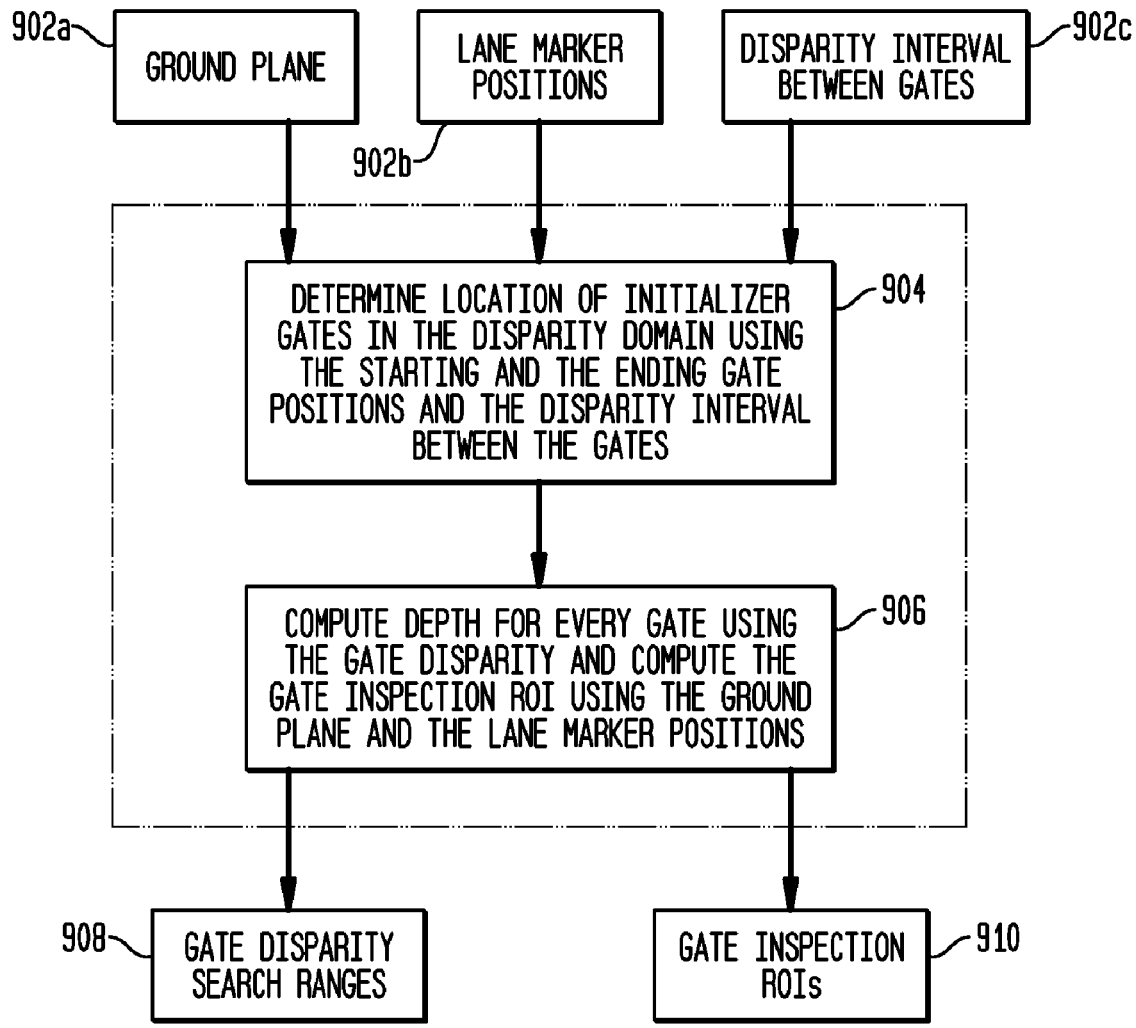
FIG. 9 illustrates a generalized flow diagram of the computational processing of regions of interest for initialization in accordance with an embodiment of the present invention.

In FIG. 9, the ROT for initialization is computed. The detection gate locations are computed based upon the required spacing in depth ahead of the host vehicle, and the road plane and lane boundary information provided by the RDA algorithm. This computation begins by retrieving, at steps 902a-902c, the ground plane, the lane marker positions and disparity interval between gates. At step 904, the location of the initializer gates in the disparity domain are determined using the starting and the ending gate positions and the disparity interval between the gates. For some gates, the disparity interval will need to be reduced to ensure that there is at least one gate at every pyramid level. The disparity interval between the two gates serves as the gate disparity search range for the closer of the two gates. Then, at step 906, the depth for every gate is computed using the gate disparity and the gate inspection ROI is computed using the ground plane and the lane marker positions. The gate inspection ROI is the projection (in the image) of the region of height and depth equal to the gate depth lying between the two lane markers and the ground. These computations, at step 906, yield gate disparity search ranges, at step 908, and gate inspection ROIs, at step 910.

Figure 10:
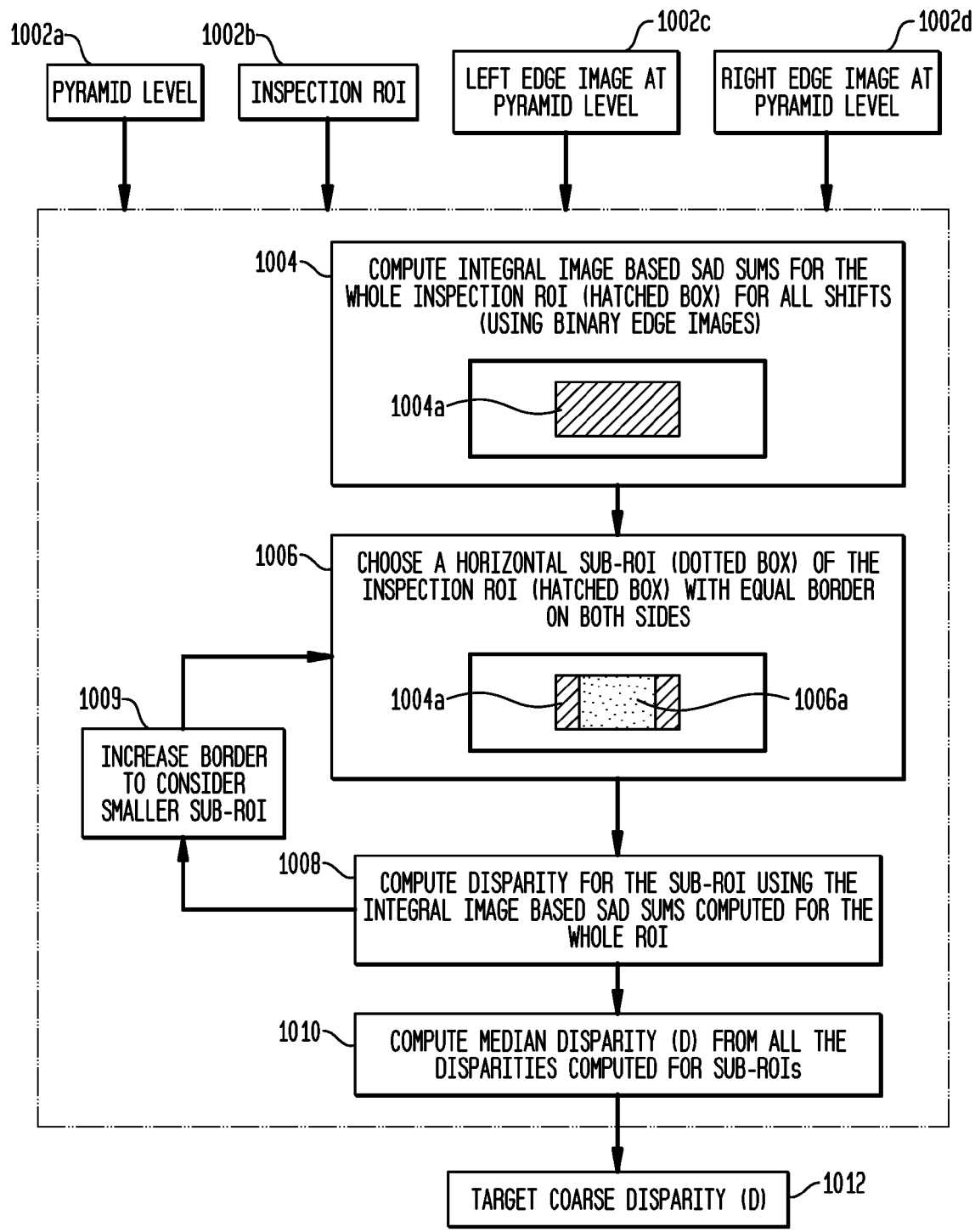
FIG. 10 illustrates a generalized flow diagram of the computational processing of coarse disparity in accordance with an embodiment of the present invention.

In FIG. 10, coarse disparity is computed, wherein for each gate inspection ROI, the integral disparity value that best aligns the majority of the extracted image edge points are computed from the left and right image pyramids. Previously calculated and constructed information with respect to the pyramid level, the inspection ROI, the left edge image at the pyramid level and the right edge image at the pyramid level are all retrieved, respectively, at steps 1002a-1002d, to execute the coarse disparity computation, the process being repeated for every gate inspection ROI. The computation is initiated at step 1004, wherein the integral image based SAD sums for the whole inspection ROI (represented by the illustrated hatched box 1004a) are computed for all shifts using the binary edge images. Then, at step 1006, a horizontal sub-ROI (represented by the illustrated dotted box 1006a) of the inspection ROI is selected having equal borders of opposing sides. The disparity for the sub-ROI may then be computed, at step 1008, using the integral image based SAD sums computed for the whole ROI. The border is then increased, at step 1009, to consider a smaller sub-ROI and loops back to step 1006. The median disparity is then computed, at step 1010, from all disparities computed for sub-ROIs, yielding the target coarse disparity at step 1012.

Figure 11:
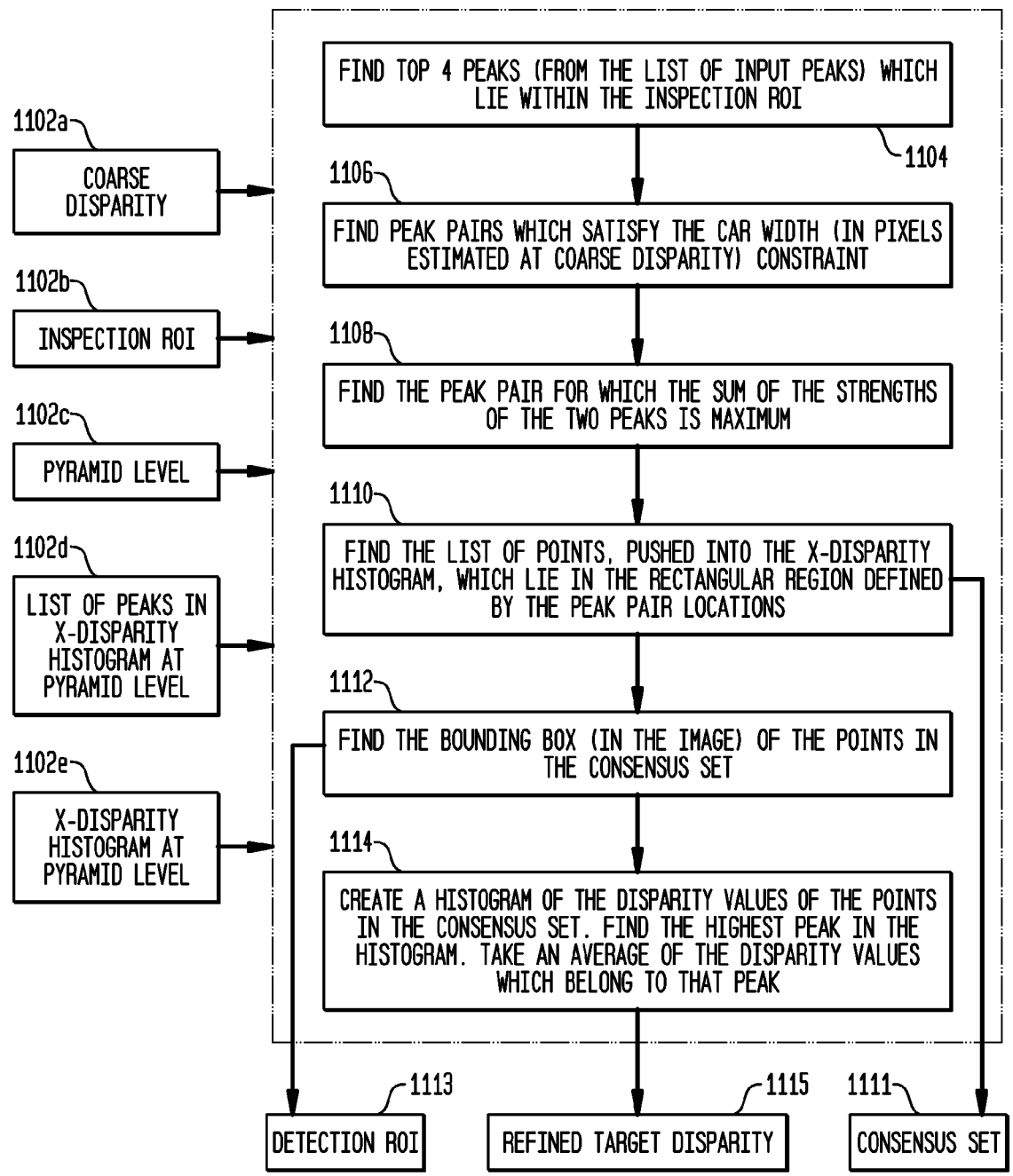
FIG. 11 illustrates a generalized flow diagram for the selection of peak pairs likely to represent the outer edges of a vehicle in accordance with an embodiment of the present invention.

Having generated a list of peaks from the X-disparity histogram construction, together with the integer (coarse) disparity estimate for a given detection gate, the pair of peaks that are most likely to represent the outer edges of a vehicle may now be selected in accordance with the process illustrated in FIG. 11. Once the appropriate peak pair is determined, the consensus set of pixels that belong to those peaks and the region between the two peaks, the detection ROI, which is the bounding box in the image that surrounds the consensus points, can be calculated. In addition, a sub-pixel disparity estimate for the consensus points may also be calculated once the appropriate peak pair has been determined.

The aforementioned peak selection process is repeated for every gate inspection ROI and is initiated by retrieving, at steps 1102a-1102e, respectively, the calculated and constructed information pertaining to the coarse disparity, the inspection ROI, the pyramid level, the list of peaks in the X-disparity histogram at the pyramid level and the X-disparity histogram at the pyramid level. With this, the top four (4) peaks, from the list of input peaks, that lie within the inspection ROI are found, at step 1104. Then, at step 1106, peak pairs that satisfy a vehicle width constraint, in pixels estimated at coarse disparity, are found, wherein the peak pair for which the sum of the strengths of the two peaks is maximum, is found at step 1108. The list of points, pushed into the X-disparity histogram, which lie in the rectangular region defined by the peak pair locations are then found, at step 1110. These points form the consensus set at step 1111. The bounding box (in the image) of the points in the consensus set is then found, at step 1112, which are used to form the detection ROI, at step 1113. Then, at step 1114, a histogram of the disparity values of the points the consensus set are created, the highest peak in the histogram is found and an average of the disparity values which belong to the peak are taken, yielding the refined target disparity, at step 1115.

Figure 12:
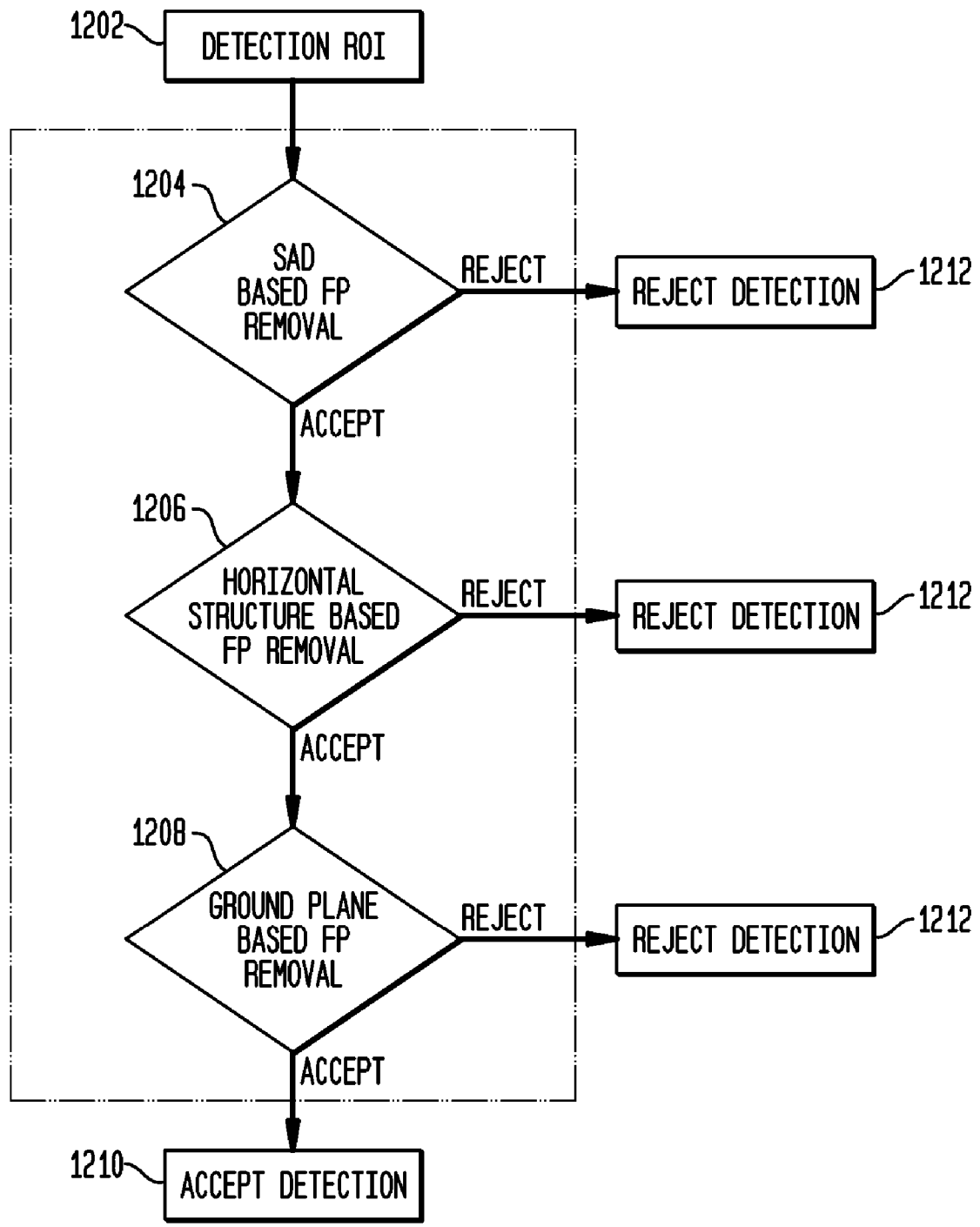
FIG. 12 illustrates a generalized flow diagram for false-positive removal processing in accordance with an embodiment of the present invention.
Figure 13:
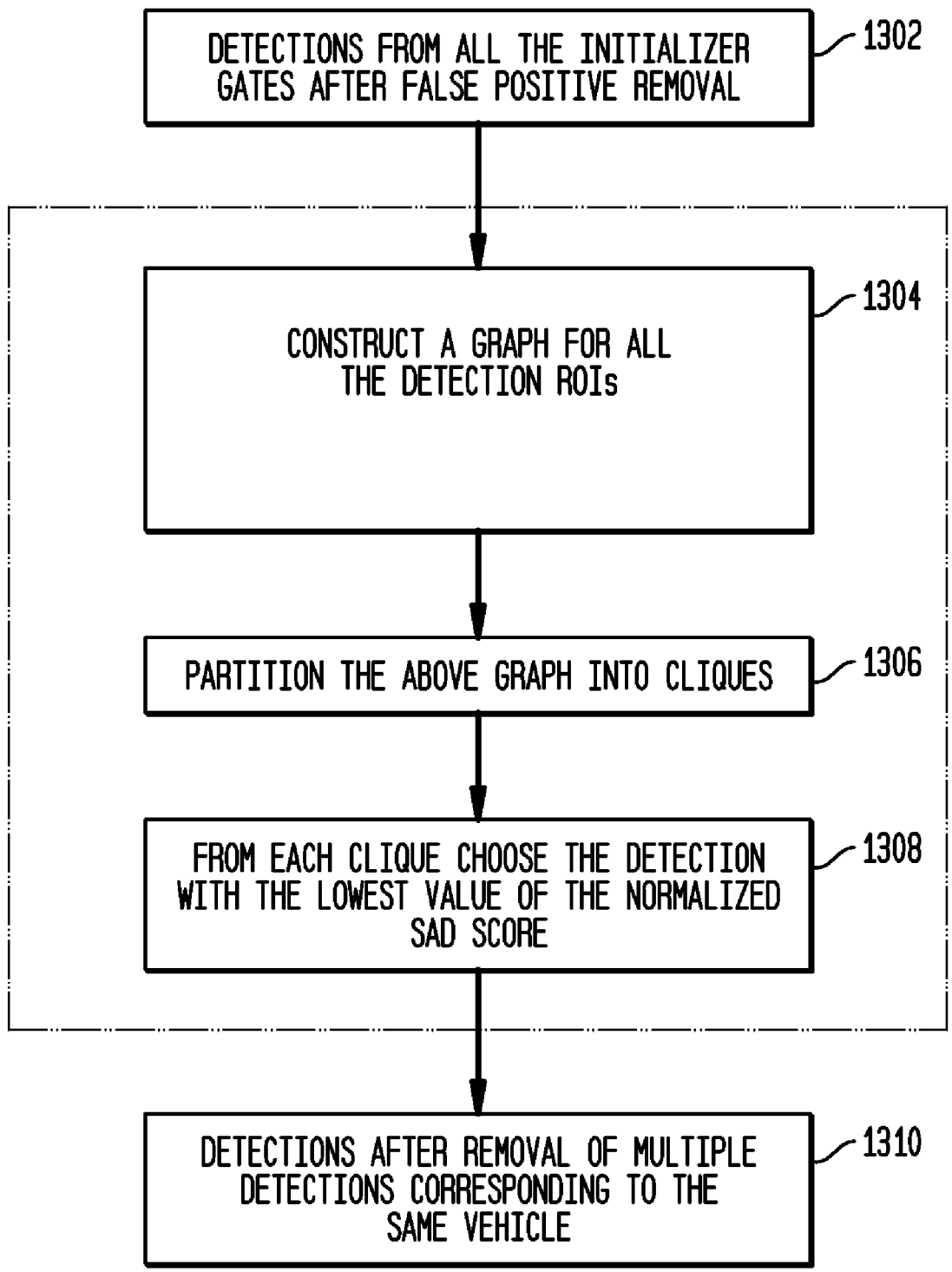
FIG. 13 illustrates a generalized flow diagram for removal processing of multiple detections of the same target vehicle in a single image frame in accordance with an embodiment of the present invention.
Figure 14:
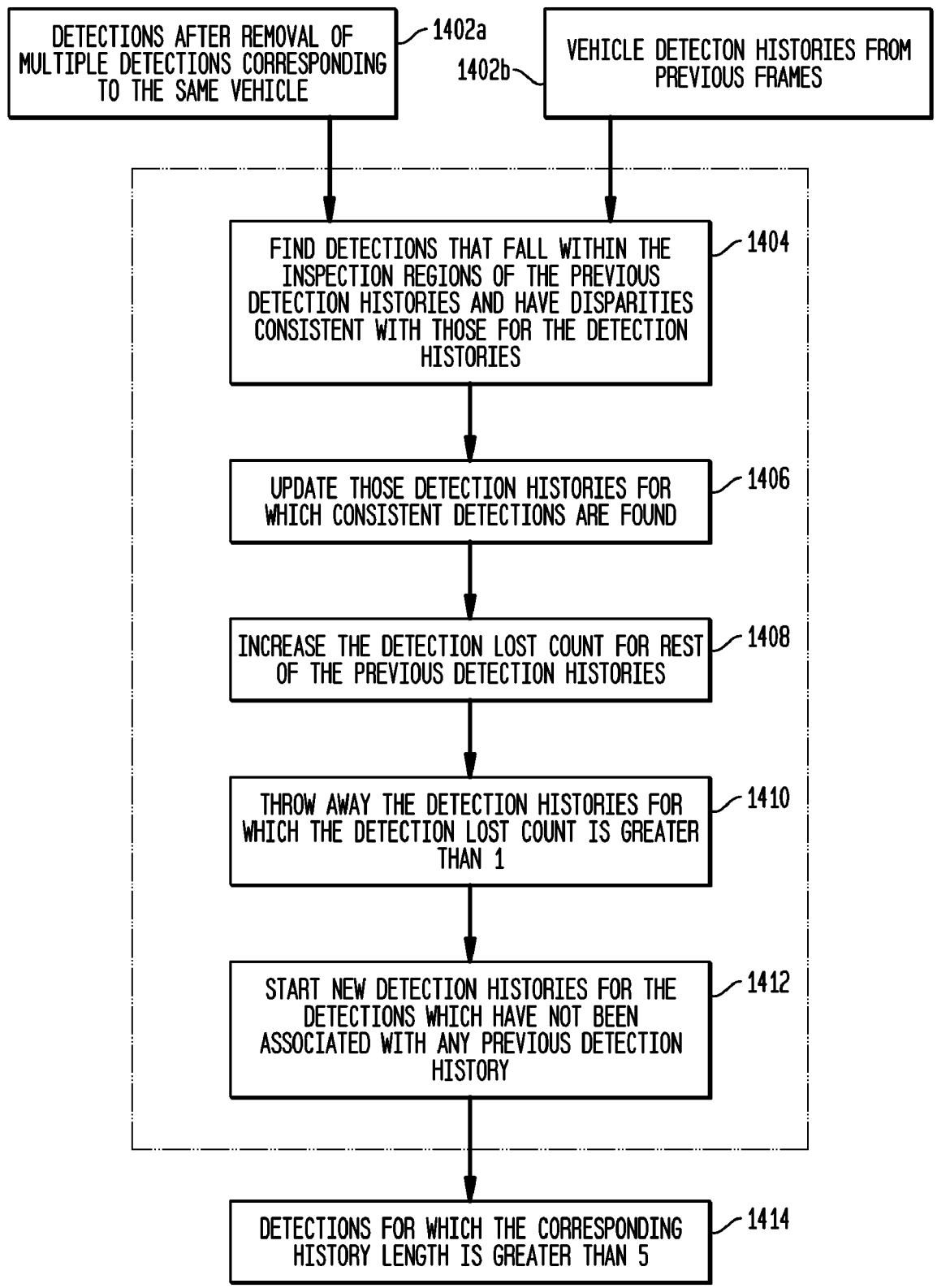
FIG. 14 illustrates a generalized flow diagram of the temporal consistency checking process in accordance with an embodiment of the present invention.
Figure 15:
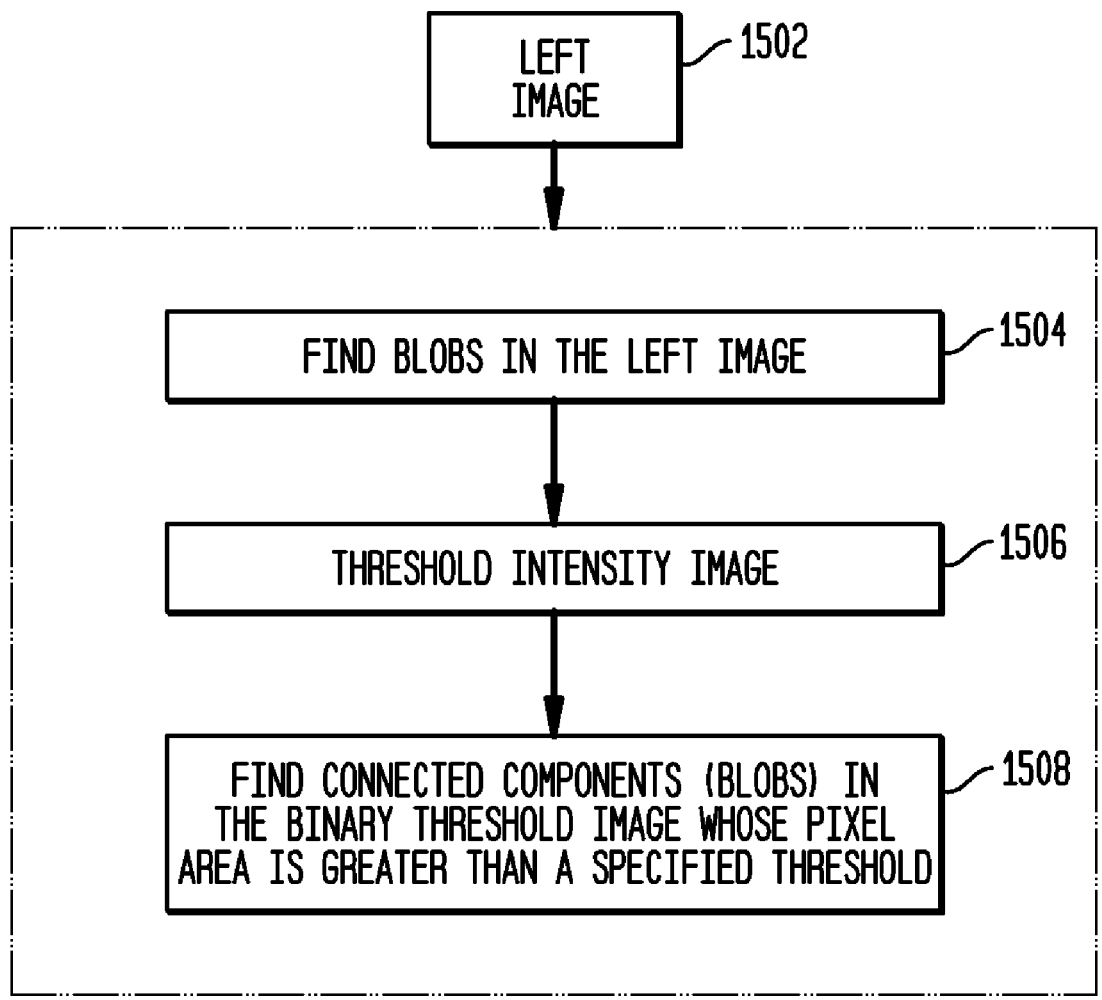
FIG. 15 illustrates a generalized flow diagram of the night-time feature extraction process in accordance with an embodiment of the present invention.

Referring now to FIG. 12, a single gate false-positive (FP) removal scheme is described. For any detection from a gate, as determined by the previously described process in connection with FIG. 11, three verification tests are applied in order to eliminate potential false detections. The first is a SAD based FP removal scheme that tests, at step 1204, how flat the region is between the two selected edge peaks. For a vehicle, the region is expected to be relatively flat. If the region between the two selected edge peaks is relatively flat, then a horizontal structure based FP removal scheme is executed, at step 1206, to determine whether a sufficient amount of horizontal edge energy is present in the image. For a vehicle, horizontal edges from the top and bottom of the vehicle, as well as the shadow edge on the road below the vehicle, is expected. Finally, if it is determined that a sufficient amount of horizontal edge energy is present, then a ground plane based FP removal scheme is engaged, at step 1208, to check how many of the consensus points overlap with image pixels that have been identified as lying on the road plane by the RDA algorithm. If too many consensus points are identified as lying on the ground plane, then the detection is most likely a false positive from the road surface, and will be rejected. If the detection ROI being tested meets the requirements of all three testing stages, then the detection is accepted at step 1210, otherwise the testing scheme is terminated, at step 1212, at the first instance of non-compliance in any one of the testing stages.

At this stage, since the detection scheme has been executed multiple times for analyzing each detection gate, it is possible that a given vehicle has been detected by more than one gate. Therefore, a scheme for the removal of multiple detections of the same lead vehicle in a single frame is engaged, as illustrated by the process flow provided in FIG. 13, which shows how these detections are consolidated into a set of unique detections (i.e., one per vehicle in the scene). Detections from all the initializer gates, after false positive removal, are retrieved, at step 1302, to construct, at step 1304, a graph for all the detection ROIs. Nodes corresponding to two detections are connected by an edge if the overlap between the detection ROIs is greater than a threshold and the difference between the disparities for the detections is less than a threshold. Thereafter, the constructed graph is partitioned, at step 1306, into cliques (i.e., completely connected components). From each clique, the detection with the lowest value of the normalized SAD score, which was computed in the SAD based FP removal scheme described in connection with FIG. 12, is chosen at step 1308. This yields, at step 1310, the unique detections corresponding to the same lead vehicle.

A final test to remove false detections is based upon temporal consistency of the detection. For every detection that survives the tests implemented in the single gate FP removal scheme (FIG. 12) and the multiple detection removal scheme (FIG. 13), a temporal history is gathered. Only if a detection persist for a given number of frames is it finally declared to be a reliable detection that can be passed on to the tracking scheme in the VDT algorithm of the present invention. A temporal consistency based FP removal scheme is implemented according to the process flow illustrated in FIG. 14, wherein the process is initiated by retrieving information related to the detections after removal of multiple detections corresponding to the same vehicle and vehicle detection histories from previous frames at steps 1402a and 1402b, respectively. Thereafter, at step 1404, detections that fall within the inspection regions of the previous detection histories and have disparities consistent with those for the detection histories are found. The detection histories for which consistent detections are found are then updated, at step 1406, and the detection lost count for the rest of the previous detection histories is increased, at step 1408. Detection histories for which the detection lost count is greater than one are thrown away, at step 1410, and new detection histories for those detections which have not been associated with any previous detection history are started, at step 1412. Detections for which the corresponding history length is greater than five are yielded at step 1414.

The nighttime detection embodiment of the VDT algorithm is designed to operate on stereo images, where the only visible parts may be illuminated portions of the vehicle (e.g., taillights and headlights). The nighttime detection embodiment is structured similarly to the daytime detection embodiment, in that there is an initialization scheme that uses a set of detection gates, and a tracking scheme that will track vehicles that have been detected by the initialization scheme. A more detailed analysis of the computation engaged in by the VDT algorithm during a nighttime search of an image scene having a lead vehicle is described with reference to the process flows illustrated in FIGS. 15-19.

In the daytime detection application, the VDT algorithm extracts the edges of vehicles and estimates the three-dimensional location of those edges. In the nighttime detection application, the VDT algorithm looks for pairs of bright "blobs" in the image that correspond to the two lights of a lead vehicle ahead of the host vehicle, and then estimates the depth to the blob pairs. The first stage is to extract all of the blobs from the intensity image, as described in connection with FIG. 15, which illustrates the process flow for night-time feature extraction. The process is initiated by receiving, at step 1502, the left image from stereo camera configuration 26. The left image of the stereo pair is thresholded, at step 1506, to extract the brightest parts of the image data, found in step 1504, since it is those parts that are likely to correspond to a vehicles headlamps or taillights. After thresholding, a binary image is stored and a connected components scheme is then applied, at step 1508, to this stored data to extract coherent "blobs" of image data that are likely correspond to single objects in the scene, such as a light or a reflective number plate.

The second stage works on a region of interest (such as a detection gate, or the ROI set by the tracker) to make pairs of blobs that could reasonably belong to a single car. Similar to the daytime detection application of the VDT algorithm, the nighttime detection application analyzes each gate traversed by the host vehicle. The blob pairing scheme that takes coherent blobs of pixels from the feature detection scheme of FIG. 15 and a detection gate inspection ROI is illustrated in the process flow diagram of FIG. 16. This process is repeated for every gate inspection ROI received at step 1602, wherein blobs lying inside the inspection region of the gate are selected, at step 1604. The blobs where the pixel area of the blob is determined to be greater than the threshold dependent on the gate depth is selected, at step 1606. Then, at step 1608, the maximum and minimum detection ROI width from the maximum and minimum depth for the gate is calculated. This calculation guides the pairing of blobs within the image ROI, wherein the blobs within the image ROI of the gate are paired based upon proximity measures, and a set of putative detection ROIs are formed as the bounding boxes that surround the various blob pairs. The blob pairing scheme proceeds, at step 1610, to find all possible pairs from the selected blobs where the vertical position of the two blobs are determined to be the same within some defined threshold and where the width of the bounding box of the blob lies between the minimum and maximum widths (as determined at step 1608). Thereafter, the bounding box for all possible blob pairs satisfying the previous constraint are computed, at step 1612, to yield, at step 1614, the possible detection ROI from all the bounding boxes.

Figure 16:
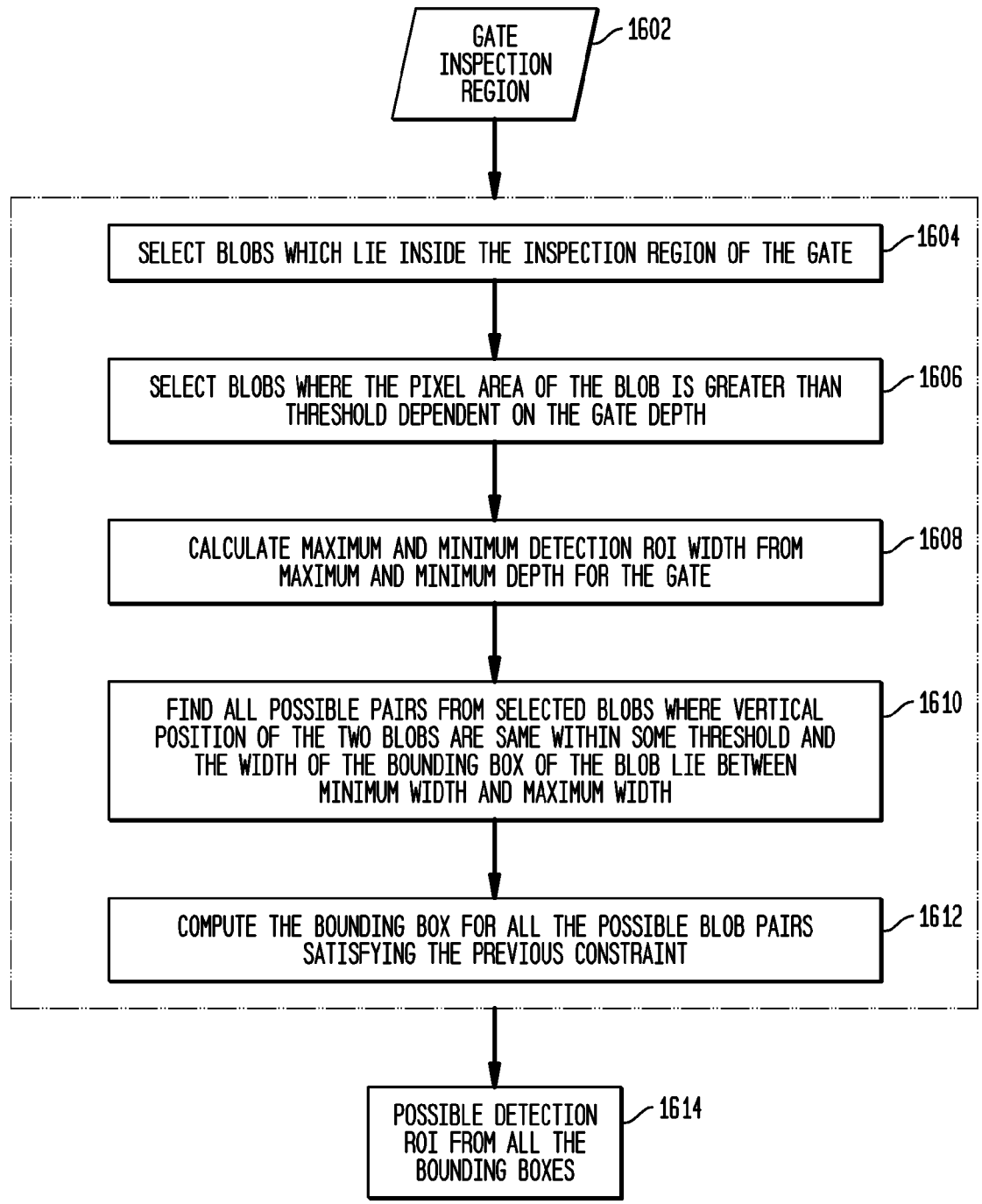
FIG. 16 illustrates a generalized flow diagram of the night-time blob pairing process in accordance with an embodiment of the present invention.
Figure 17:
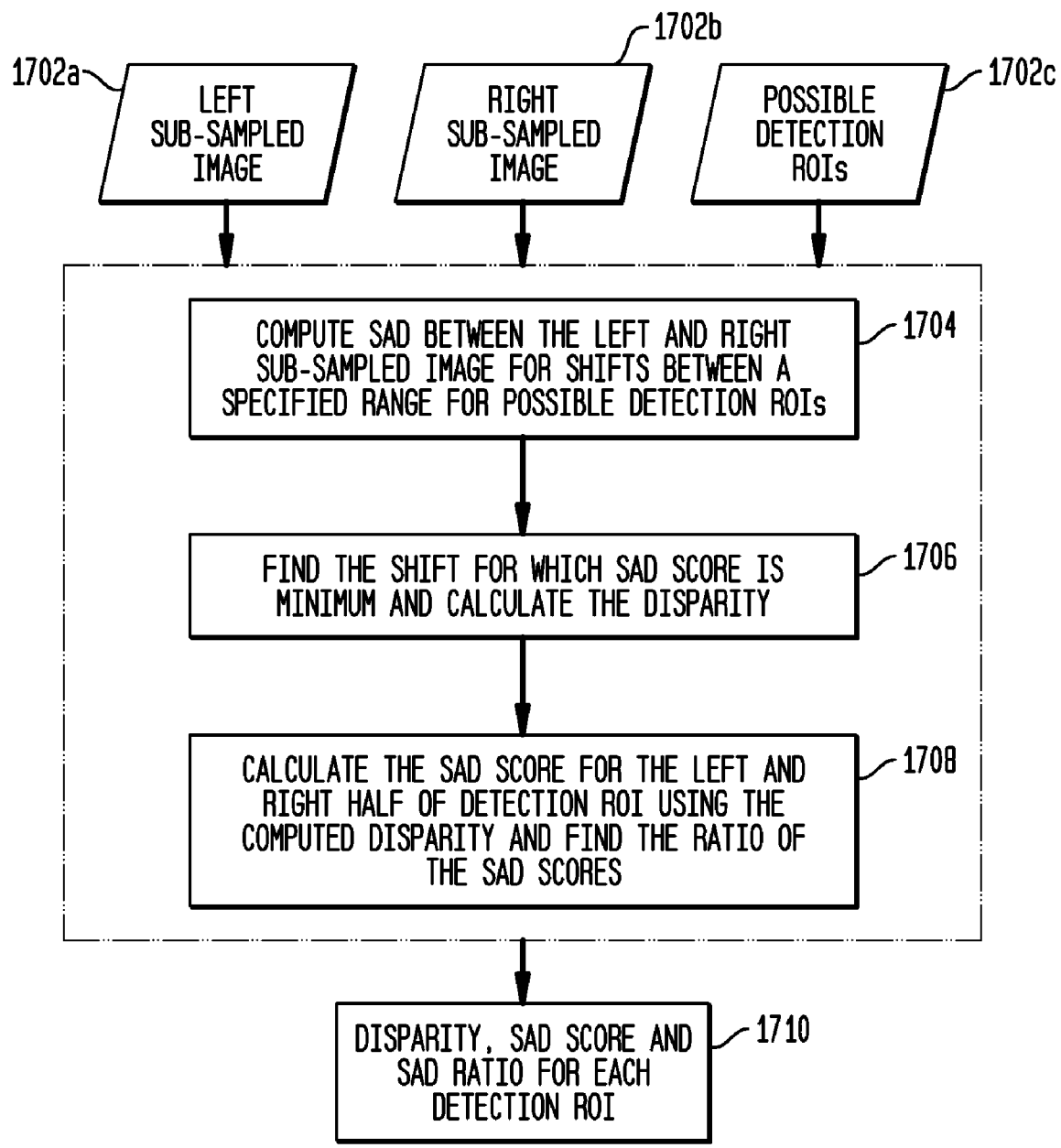
FIG. 17 illustrates a generalized flow diagram of the night-time depth estimation process in accordance with an embodiment of the present invention.

The possible detections determined by the blob pairing scheme in FIG. 16 are then passed on to a depth estimation stage, described in connection with the process flow of FIG. 17, which estimates the range to the blob pairs. The depth estimation process receives image data associated with the left sub-sampled image, at step 1702*a* the right sub-sampled image, at step 1702*b* and the possible detection ROIs (determined in the process flow of FIG. 16), at step 1702*c*. For each of the blob pair detection ROIs, a disparity estimate using SAD scores between the left and right images at the appropriate pyramid level is computed. The SAD between the left and right sub-sampled image for shifts between a specified range (e.g., [gate presearch−5] to [gate presearch+7]) is calculated, at step 1704, for possible detection ROIs. Then, at step 1706, the scheme determines for which shift the SAD score is minimum and calculates the disparity using a quadratic interpolation of the SAD score for minimum shift. This is the refined disparity of the detection ROI. To mitigate the effects of pixel blooming when using, for example, a CCD camera, in addition to estimating the disparity using SAD for the whole ROI, the disparity for the left and right halves of the ROI are also estimated separately, and the ratio of the SAD scores for each half in addition to the disparity value calculated for the whole potential detection ROI are stored. Thus to circumvent blooming, with the assumption that both the left and right taillights have similar blooming, the SAD score for the left and right half of the detection ROI is calculated, at step 1708, using the computed disparity, and the ratio of the SAD scores is found, yielding, at step 1710, disparity, SAD scores and SAD ratio for each detection ROI.

Figure 18:
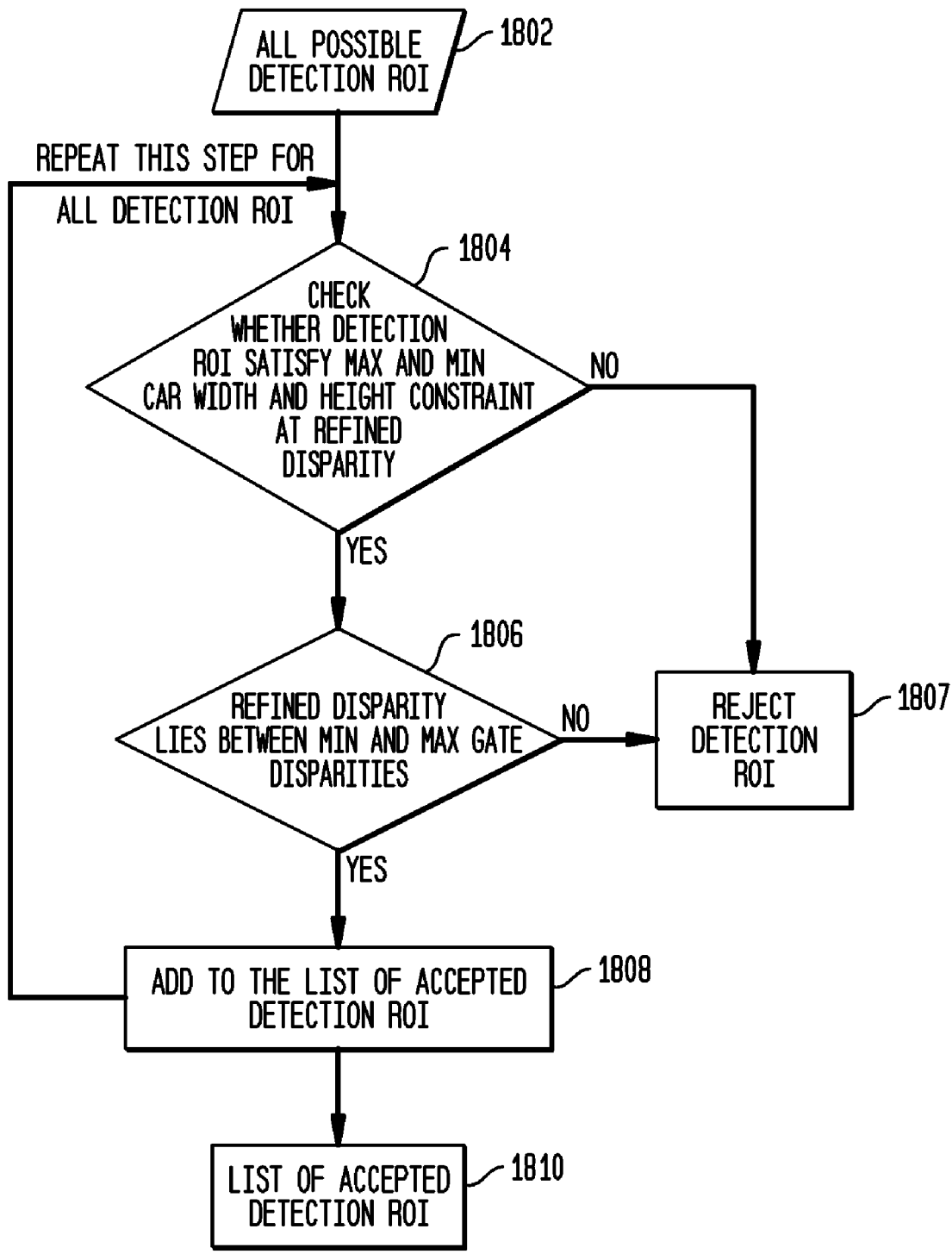
FIG. 18 illustrates a generalized flow diagram of the night-time detection ROI size testing process in accordance with embodiment of the present invention.

For all of the detection ROIs, the size of the detected ROI and the disparity of the detected ROI are tested, in accordance with the process flow illustrated in FIG. 18, to determine whether they are appropriate for the gate in which that ROI was originally found. Here, as previously described in connection with the daytime application, the flatness of a scene between a blob pair, as well as the width and height (e.g., in meters) of the region defined by the bounding box of the blob pair, is checked. If the flatness and size of the detected pair are deemed satisfactory, then there, may be a possible detection. All of the detection ROIs received, at step 1802, are checked, at step 1804, to determine whether the detection ROI satisfies a maximum and minimum car width value, as well as a height constraints, at the refined disparity. If so, then the associated refined disparity is checked, at step 1806, to determine whether it lies between the minimum and maximum gate disparities. If either of these tests are failed, the detection ROI is rejected at step 1807. If both tests are passed, then the detection ROI is identified, at step 1808, as an acceptable detection ROI and the verification scheme yields, at step 1810, a list of accepted detection ROIs. The tests employed by this verification scheme are then reiterated for the remaining possible detection ROIs.

Figure 19:
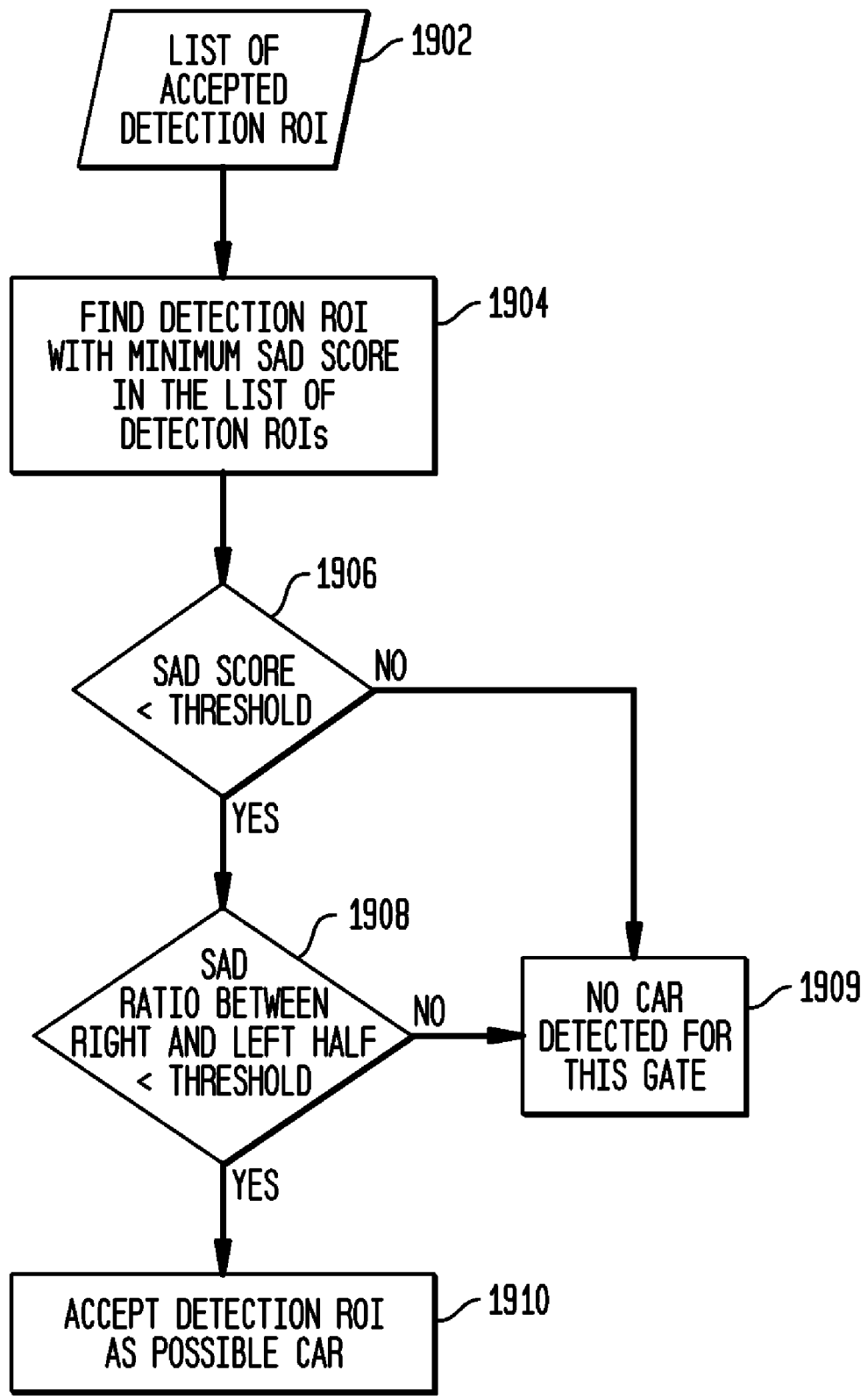
FIG. 19 illustrates a generalized flow diagram of the night-time final verification process in accordance with an embodiment of the present invention.

Potential detections that pass both of the aforementioned tests are retained and passed to the next verification stage, illustrated by the process flow of FIG. 19. A detection for a gate will only be accepted if its SAD score for the estimated disparity is below a pre-determined threshold, and also if its SAD score for the left and right halves of the ROI are similar. This final verification stage receives, at step 1902, the list of accepted detection ROIs. At step 1904, the detection ROI with the minimum SAD score in the list is then found and subjected to a condition, at step 1906, to determine whether or not this minimum SAD score is less than the pre-determined threshold value. If the value is determined to be acceptable, then the SAD ratio between the right and left halves is subsequently tested, at step 1908, to determine if it is less than a threshold value. Failure to satisfy the threshold conditions in both of the tests at steps 1906 and 1908 will yield, at step 1909, in a determination that no vehicle has been detected for the particular gate. Otherwise, satisfaction of both test conditions will result in the detection ROI being accepted, at step 1910, as a possible vehicle. When the detection passes and is accepted, it is verified for that particular frame and is then passed to the temporal consistency test previously described in connection with the daytime application of the VDT algorithm, as illustrated in the process flow diagram of FIG. 14. Only after the detection has persisted for a sufficient number of frames will that detected vehicle be introduced to the vehicle tracker.

One skilled in the art will appreciate that the present invention can be practiced by other than the described embodiments, which are presented for purposes of illustration and not by way of limitation, and the present invention is limited only by the claims that follow.

What is claimed is:

1. A computer-implemented method for adaptive regulation of distance between a host vehicle and a lead vehicle, comprising:

receiving, at an image processing unit, a stereo image of a roadway scene;

locating, using a road detection and awareness module at said image processing unit, said roadway scene in a headway direction of said host vehicle, computing, using said road detection and awareness module, a plurality of vehicle detection gates, wherein each of said vehicle detection gates specifies a region of interest (ROI) of the roadway scene of the stereo image and a depth interval between said vehicle detection gates of the roadway scene of the stereo image, said each vehicle detection gate overlaps a portion of an adjacent detection gate;

identifying, using said road detection and awareness module, at least two lane boundary markers in said stereo image of said roadway scene;

retrieving, using said road detection and awareness module, ground plane data, said lane boundary markers, and said depth interval/range between said vehicle detection gates;

computing, using said road detection and awareness module, depth for each said vehicle detection gate using the depth interval and computing said region of interest (ROI) for each said vehicle detection gate using the ground plane data and the lane marker positions, wherein said ROI is a projection in the image of the roadway scene of height and depth equal to the depth of the vehicle detection gate lying between two lane boundary makers and the ground;

detecting, using a vehicular detection and tracking module at said image processing unit, potential lead vehicle detections among said vehicle detection gates on said roadway scene in said headway direction of said host vehicle, wherein said detecting comprising searching for edge features/pixels for the potential lead vehicle in said depth range within said ROI;

receiving a plurality of left images and a plurality of right images of the stereo image for each said gate ROI;

sub-sampling said plurality of the left images and the right images along a horizontal axis; and filtering said sub-sampled left images and said sub-sampled right images, applying a vertical sobel application to said sub-sampled left images to compute vertical left sobel edge images, wherein said vertical left sobel edge images are candidate image pixels for left edge pixels;

selecting said left candidate image pixels as said left edge pixels based on a threshold;

computing an intensity histogram for said selected left edge pixels to obtain a total number of said selected left sobel edge pixels and;

thresholding the vertical left sobel image using the intensity histogram for said selected right edge pixels to produce a left edge pyramid, wherein said left edge pyramid is a binary image comprising said selected left sobel edge pixels.

2. The method of claim 1 further comprising:

receiving, at the image processing unit, a preset cruise speed for said host vehicle;

verifying, using said vehicular detection and tracking module, said potential lead vehicle detections to be in the headway direction of the host vehicle;

tracking, using said vehicular detection and tracking module, said verified lead vehicle detection and estimating forward and lateral motion of said lead vehicle with respect to said host vehicle; and adjusting, using an ACC controller, said preset cruise speed of said host vehicle based on said estimated forward and lateral motion data associated with said lead vehicle.

3. The method of claim 1 further comprising the steps of:

(d) applying a vertical sobel application to said sub-sampled right images to compute vertical right sobel edge images, wherein said vertical right sobel edge images are candidate image pixels for right edge pixels;

(e) selecting said right candidate image pixels as said right edge pixels based on said threshold;

(f) computing an intensity histogram for said selected right edge pixels to obtain a total number of said selected right sobel edge pixels;

(g) thresholding the vertical right sobel image using the intensity histogram for said selected right edge pixels to produce a right edge pyramid, wherein said right edge pyramid is a binary image comprising said selected right sobel edge pixels.

4. The method of claim 3 further comprising:

executing stereo matching between the left and the right edge pyramids to yield an estimated disparity/depth data for every edge pixel in one of the left edge image and the right edge image;

computing a 2D disparity histogram using said disparity data and 3D location of each of the vertical image pixels; and locating and identifying peaks in said 2D disparity histogram; wherein said peaks comprise vertical image pixels likely to be outer edges of the left edge images and the right edge images of the potential lead vehicle detection.

5. The method of claim 4 further comprising computing coarse disparity of the edge pixels for the potential lead vehicle detections, wherein said coarse disparity is an integral disparity value that best aligns a with majority of the edge pixels from the computed left and right edge pyramids for each said gate ROI.

6. The method of claim 5 further comprising:

selecting a left peak in the left outer edge image and a right peak in the right outer edge image;

computing an average disparity of all the pixels between said left and right peaks to compute a refined disparity/depth data of the edge pixels for the potential lead vehicle detections;

defining a region to be a detection ROI; said detection ROI defining a region including the pixels at the selected left and the right peaks and the pixels in between the selected left and the right peaks.

7. The method of claim 6 wherein said verifying further comprising:

applying a false positive removal scheme to each of the detection ROI of the potential lead vehicle detections;

removing multiple detections of the detection ROIs of the lead vehicle to yield a set of unique detections, wherein each said unique detection is associated to a separate one of said potential lead vehicle detections; and applying a temporal consistency based false positive removal scheme to the set of unique detections to remove false detections from the set of unique detections.

8. A computer-implemented method for adaptive regulation of distance between a host vehicle and a lead vehicle, comprising:

receiving, at an image processing unit, a stereo image of a roadway scene;

locating, using a road detection and awareness module at said image processing unit, said roadway scene in a headway direction of said host vehicle, computing, using said road detection and awareness module, a plurality of vehicle detection gates, wherein each of said vehicle detection gates specifies a region of interest (ROI) of the roadway scene of the stereo image and a depth interval between said vehicle detection gates of the roadway scene of the stereo image, said each vehicle detection gate overlaps a portion of an adjacent detection gate;

identifying, using said road detection and awareness module, at least two lane boundary markers in said stereo image of said roadway scene;

retrieving, using said road detection and awareness module, ground plane data, said lane boundary markers, and said depth interval/range between said vehicle detection gates;

computing, using said road detection and awareness module, depth for each said vehicle detection gate using the depth interval and computing said region of interest (ROI) for each said vehicle detection gate using the ground plane data and the lane marker positions, wherein said ROI is a projection in the image of the roadway scene of height and depth equal to the depth of the vehicle detection gate lying between two lane boundary makers and the ground;

detecting, using a vehicular detection and tracking module at said image processing unit, potential lead vehicle detections among said vehicle detection gates on said roadway scene in said headway direction of said host vehicle, wherein said detecting comprising searching for blobs for the potential lead vehicle in said depth range within said ROI;

receiving a plurality of left images and a plurality of right images of the stereo image for each said gate ROI;

sub-sampling said plurality of the left images and the right images along a horizontal axis;

filtering said sub-sampled left images and said sub-sampled right images;

selecting said bobs located inside said ROI;

determining a maximum width of the ROI and a minimum width of the ROI;

retrieving pairs of blobs from the selected blobs, wherein said retrieved pairs of blobs are at least two of the selected blobs having a vertical position to be same within a defined threshold and width of a bounding box of the selected blobs is between the maximum width and the minimum width of the ROI; and computing bounding boxes for all said retrieved blob pairs to define detection ROIs.

9. The method of claim 8 further comprising the steps of:

computing disparity of each said detection ROI, sum of absolute difference (SAD) score of each said computed disparity of each said detection ROI and ratio of said SAD using said left sub-sampled image, said right sub-sampled image and said detection ROIs.

10. The method of claim 9 wherein said verifying further comprising the steps of:

determining whether the detection ROI satisfies predefined width and height constraints of the potential lead vehicle;

determining whether said computed disparity of said detection ROI that satisfies said predefined constraints fulfill the criteria of lying between maximum and minimum disparity values of the vehicle detection gate;

identifying a list of said detection ROIs that satisfy said criteria.

11. The method of claim 10 further comprising the steps of:

determining whether the SAD score of said identified detection ROI is below a pre-determined threshold;

determining whether the SAD score for the left half image of the identified detection ROI and the right half image of the identified detection ROI are same;

selecting said identified detection ROI as a potential lead vehicle if said SAD score of said identified detection ROI is below said pre-determined threshold and said the SAD score for left half image of the identified detection ROI and the right half image of the identified detection ROI are the same.

* * * * *